US007937578B2

(12) United States Patent
O'Neill

(10) Patent No.: US 7,937,578 B2
(45) Date of Patent: *May 3, 2011

(54) COMMUNICATIONS SECURITY METHODS FOR SUPPORTING END-TO-END SECURITY ASSOCIATIONS

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 1075 days.

This patent is subject to a terminal disclaimer.

(21) Appl. No.: 10/685,720

(22) Filed: Oct. 15, 2003

(65) Prior Publication Data

US 2004/0098622 A1    May 20, 2004

Related U.S. Application Data

(60) Provisional application No. 60/465,510, filed on Apr. 25, 2003, provisional application No. 60/426,332, filed on Nov. 14, 2002.

(51) Int. Cl.
*H04L 29/06* (2006.01)
(52) U.S. Cl. .................. 713/151; 713/153; 713/160
(58) Field of Classification Search .............. 713/150, 713/151, 153, 160
See application file for complete search history.

(56) References Cited

U.S. PATENT DOCUMENTS

| | | | |
|---|---|---|---|
| 5,325,432 A | | 6/1994 | Gardeck et al. |
| 5,347,450 A | * | 9/1994 | Nugent .................. 709/243 |
| 5,450,405 A | | 9/1995 | Maher et al. |
| 5,473,605 A | | 12/1995 | Grube et al. |
| 5,491,749 A | * | 2/1996 | Rogaway .................. 713/171 |
| 5,491,835 A | | 2/1996 | Sasuta et al. |
| 5,511,232 A | | 4/1996 | O'Dea et al. |
| 5,513,381 A | | 4/1996 | Sasuta |
| 5,572,528 A | | 11/1996 | Shuen |
| 5,737,328 A | | 4/1998 | Norman et al. |
| 5,806,007 A | | 9/1998 | Raith et al. |
| 5,898,922 A | | 4/1999 | Reininghaus |

(Continued)

FOREIGN PATENT DOCUMENTS

EP    1244261    9/2002

(Continued)

OTHER PUBLICATIONS

C. Perkins, Editor "IP Mobility Support", Network Working Group, pp. 1-79 (Oct. 1996).

(Continued)

*Primary Examiner* — David García Cervetti
(74) *Attorney, Agent, or Firm* — Raphael Freiwirth

(57) ABSTRACT

Methods and apparatus facilitating mobile node paging in a system where a mobile node is able to hand off application processing to an application proxy are described. Paging determinations are made based on application processing results corresponding to processing the content of multiple packet payloads. In some cases paging determinations are made based on processing the payload of a single packet in conjunction with information received from a mobile node, e.g., intermediate application processing results, mobile node state information, etc. To facilitate application processing handoffs in a manner that is transparent to a peer node involved in an ongoing communications session with the mobile node, security information may be passed between the mobile node and the application proxy node in a manner that is transparent to the peer node allowing an end to end security association to be maintained throughout the communications session with the peer node.

51 Claims, 20 Drawing Sheets

U.S. PATENT DOCUMENTS

| | | | |
|---|---|---|---|
| 5,987,323 A | 11/1999 | Huotari | |
| 6,144,671 A | 11/2000 | Perinpanathan et al. | |
| 6,256,300 B1 | 7/2001 | Ahmed et al. | |
| 6,282,183 B1* | 8/2001 | Harris et al. | 370/338 |
| 6,345,303 B1* | 2/2002 | Knauerhase et al. | 709/238 |
| 6,504,839 B2 | 1/2003 | Valentine et al. | |
| 6,505,047 B1 | 1/2003 | Palkisto | |
| 6,510,144 B1 | 1/2003 | Dommety et al. | |
| 6,567,416 B1 | 5/2003 | Chuah | |
| 6,567,664 B1 | 5/2003 | Bergenwall et al. | |
| 6,571,289 B1 | 5/2003 | Montenegro | |
| 6,628,943 B1 | 9/2003 | Agrawal et al. | |
| 6,684,331 B1* | 1/2004 | Srivastava | 713/163 |
| 6,690,659 B1 | 2/2004 | Ahmed et al. | |
| 6,763,007 B1 | 7/2004 | La Porta et al. | |
| 6,889,321 B1* | 5/2005 | Kung et al. | 713/153 |
| 6,944,777 B1* | 9/2005 | Belani et al. | 713/150 |
| 7,103,185 B1* | 9/2006 | Srivastava et al. | 380/277 |
| 7,647,498 B2* | 1/2010 | Brown et al. | 713/168 |
| 2002/0068565 A1 | 6/2002 | Purnadi et al. | |
| 2002/0114469 A1 | 8/2002 | Faccin et al. | |
| 2002/0136226 A1 | 9/2002 | Christoffel et al. | |
| 2002/0191593 A1 | 12/2002 | O'Neill et al. | |
| 2002/0199102 A1* | 12/2002 | Carman et al. | 713/168 |
| 2003/0051140 A1 | 3/2003 | Buddhikot et al. | |
| 2003/0137961 A1 | 7/2003 | Tsirtsis et al. | |
| 2003/0176188 A1 | 9/2003 | O'Neill | |
| 2004/0034776 A1* | 2/2004 | Fernando et al. | 713/171 |
| 2004/0073629 A1* | 4/2004 | Bazot et al. | 709/217 |
| 2004/0185842 A1* | 9/2004 | Spaur et al. | 455/420 |
| 2004/0236965 A1* | 11/2004 | Krohn | 713/201 |
| 2006/0064736 A1* | 3/2006 | Ahuja et al. | 726/1 |
| 2006/0143453 A1* | 6/2006 | Imamoto et al. | 713/169 |
| 2006/0218210 A1* | 9/2006 | Sarma et al. | 707/204 |
| 2010/0106970 A1* | 4/2010 | Brown et al. | 713/168 |

FOREIGN PATENT DOCUMENTS

| | | |
|---|---|---|
| JP | 2000196678 | 7/2000 |
| JP | 2003209890 | 7/2003 |

OTHER PUBLICATIONS

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IETF Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

International Search Report PCT/US2003/032884, International Search Authority/US, Nov. 2, 2004.

Network Working Group, "IP Mobility Support for IPv4", C. Perkins, Ed., Nokia Research Center, Jan. 2002, downloaded from http://www.ietf.org on Dec. 29, 2004, pp. 1-92.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Johnson, D. et al. IETF Mobile IP Working Group, "Mobility Support in IPv6,"; Feb. 26, 2003 Downloaded From http://www.join.uni-muenster.de on Dec. 29, 2004, pp. 1-169.

Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.

* cited by examiner

COMMUNICATIONS SECURITY METHODS FOR SUPPORTING END-TO-END SECURITY ASSOCIATIONS

RELATED APPLICATIONS

This application claims the benefit of U.S. Provisional Patent Application No. 60/465,510, filed Apr. 25, 2003 and U.S. Provisional Patent Application No. 60/426,332, filed Nov. 14, 2002.

FIELD OF THE INVENTION

The present application relates to communications methods and, more particularly, to methods and apparatus for supporting paging and/or end to end security associations in communications systems which allow and end node, e.g., a mobile node, to handoff application processing responsibility to an application proxy.

BACKGROUND

Mobile IP (v4/v6), also indicated as MIPv4 and MIPv6 enables a mobile node (MN) to register its temporary location indicated by a care-of-address (CoA) to its Home Agent (HA). MIPv4 is described at http://www.ietf.org/rfc/rfc3220.txt MIPv6 is described in http:Hwww.ietf.org/inte-net-drafts/draft-ietf-mobileip-ipv6-21.txt. In MIP the HA then keeps a mapping (also called a binding) between the MN's permanent address, otherwise called Home Address (HoA), and the registered CoA so that packets for that MN can be redirected to its current location using IP encapsulation techniques (tunneling).

The CoA used by a MN can be an address that belongs to a Foreign Agent (FA) when MIPv4 is used or, in MIPv4 and MIPv6, it can be a temporarily allocated address to the MN itself in which case is called a collocated care-of-address (CCoA).

The concepts and solutions described here are applicable to both MIPv4 and MIP unless otherwise mentioned.

MIPv4/v6 also has a feature called reverse tunneling. This ensures that all uplink traffic from the MN goes via the HA before its final destination. The traffic is essentially tunnelled back to the HA either by the MN itself or by the FA the MN is connected to. Similarly as before, the HA will not accept reverse tunnelled packets from a given CoA or CCoA unless the MN registers that CoA/CCoA with it.

In Mobile IP the home subnet is the location of the HA and is also where the MN is typically located. When a MN is on its home subnet, the MN responds to Address Resolution Protocol (ARP) requests for the HoA. When it is away from home, the HA instead uses proxy ARP to respond to ARP requests for the HoA of the MN so that packets for the MN are routed towards and by the HA towards the current CoA. When a MN returns home, the HA and the MN send gratuitous ARP signals to update all the ARP caches to inform them that the MN is now home and that the link-layer address for the HoA is now that of the MN and not the HA. If the MN is not at home, and the HA does not have a current CoA binding for the MN, then both the HA and the absent MN will ignore incoming packets which will blindly be dropped on the subnet. The AR processing is described in section 4.6 of IETF RFC 3220. In mobility systems, such as in 3G cellular or 802.11, especially when dynamic addressing is employed, the MN typically does not have a home subnet and there is never a MN available to respond to ARP requests in the absence of a current CoA binding in the HoA, maintained by the MN.

Additionally, in mobility systems, the MN may be absent from the system for a number of reasons. The MN could be switched off, unreachable in a disconnected part of the Internet fabric (a private domain), it could be in various forms of power-saving sleep states, or could simply not wish to be reachable on a specific HoA (privacy, on-leave etc). Therefore, when the MN is absent and not maintaining its CoA binding, incoming packets for that HoA will simply be dropped on the local subnet.

SUMMARY OF INVENTION

The methods and apparatus of the present invention allow a server, referred to as a proxy MN server, to act as a proxy for an MN with regard to one or more active applications when the MN is unavailable, e.g., in sleep mode, otherwise absent, or unreachable. Thus, applications which might time out due to a lack of signals from an MN may be maintained even while the MN is absent. This allows the MN to continue interacting with an application when it returns, e.g., awakens from a sleep mode of operation.

Methods and apparatus facilitating mobile node paging in a system where a mobile node is able to hand off application processing to an application proxy are described. Paging determinations are made based on application processing results corresponding to processing the content of multiple packet payloads. In some cases paging determinations are made based on processing the payload of a single packet in conjunction with information received from a mobile node, e.g., intermediate application processing results, mobile node state information, etc. To facilitate application processing handoffs in a manner that is transparent to a peer node involved in an ongoing communications session with the mobile node, security information may be passed between the mobile node and the application proxy node in a manner that is transparent to the peer node, allowing an end to end security association to be maintained throughout the communications session with the peer node.

Numerous additional features, benefits and exemplary embodiments are described in the detailed description which follows.

DETAILED DESCRIPTION

Figure 1:
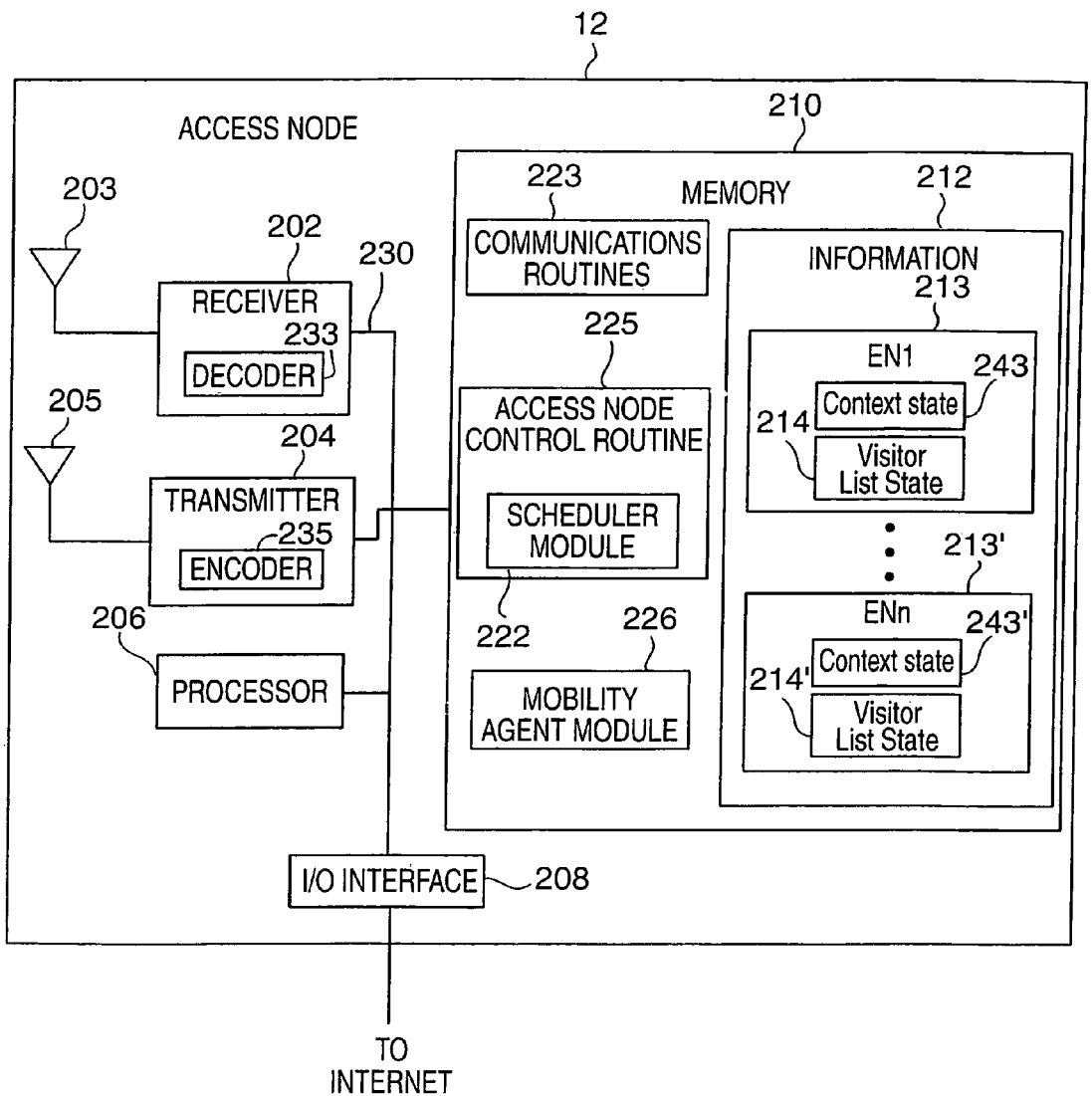
FIG. 1 illustrates an exemplary access node implemented in accordance with the present invention.

FIG. 1 illustrates an exemplary access node 12, e.g., access router or base station, implemented in accordance with the invention. The access node 12 includes antennas 203, 205 and corresponding receiver, transmitter circuitry 202, 204, respectively. The receiver circuitry 202 includes a decoder 233 while the transmitter circuitry 204 includes an encoder 235. The circuitry 202, 204 is coupled by a bus 230 to an I/O interface 208, a processor (e.g., CPU) 206 and memory 210. The I/O interface 208 couples the access mode 12, e.g., base station, to the Internet. The memory 210 includes routines, which when executed by the processor 206, cause the access node 12 to operate in accordance with the invention. Memory includes communications routines 223 used for controlling the access node 12 to perform various communications operations and implement various communications protocols. The memory 210 also includes an access node control routine 225 used to control the access node's 12, e.g. base station's, operation and signaling to implement the steps of the method of the present invention. The access node control routine 225 includes a scheduler module 222 used to control transmission scheduling and/or communication resource allocation. Thus, module 222 may serve as a scheduler. The memory 210 also includes a mobility agent module 226 used to process and send mobility related signaling implementing the steps of the method of the present invention. Thus, module 226 may serve as a Mobile IPv4 Foreign Agent or a Mobile IPv6 Attendant. Memory 210 also includes information 212 used by communications routines 223, control routine 225 and mobility agent module 226. The information 212 includes an entry 213, 213' for each active end node (EN1, ENn, respectively), which includes the context state 243, 243' at the access node associated with each end node (EN1, ENn), said context state being passed between access nodes during hand-off of the end node, and including such information as the end node profile, security associations, and end node multicast membership. Entry 213, 213' also includes MIP visitor list state 214, 214' associated with said end node (EN1, ENn), respectively, at that access node. In particular, information for end node 1 213 includes context state 243 for end node 1 213, and includes MIP visitor list state 214, shown in detail in FIG. 4.

Figure 2:
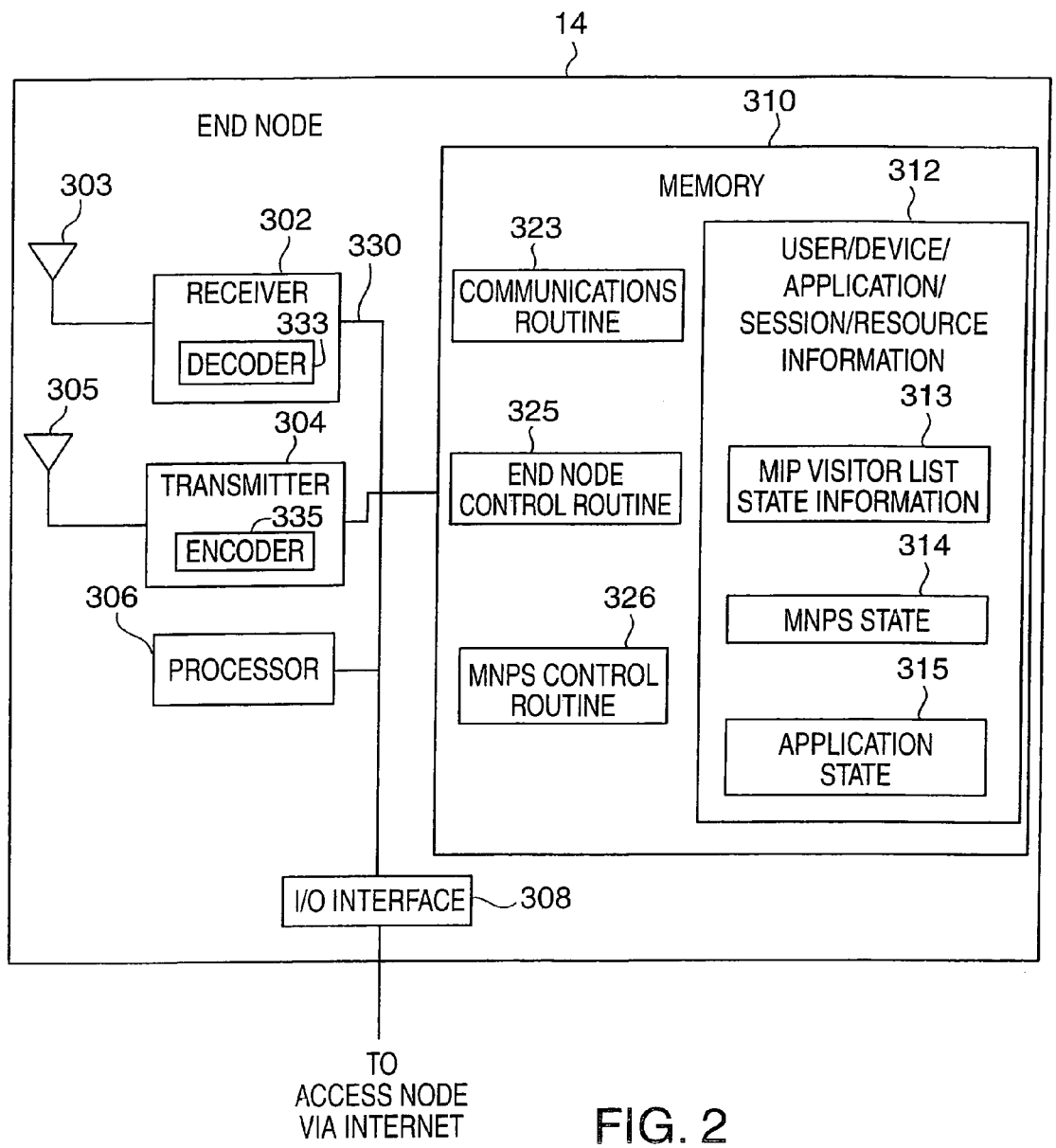
FIG. 2 illustrates an exemplary end node implemented in accordance with the present invention.

FIG. 2 illustrates an exemplary end node 14 implemented in accordance with the present invention. The end node 14 may be used by a user as a mobile terminal (MT) or the end node can act as the Mobile Node proxy Server (MNPS) for a mobile terminal (MT). The end node 14 includes receiver and transmitter antennas 303, 305 which are coupled to receiver and transmitter circuitry 302, 304 respectively, when the end node is connected to the access node 12 via a wireless link. The receiver circuitry 302 includes a decoder 333 while the transmitter circuitry 304 includes an encoder 335. The receiver transmitter circuits 302, 304 are coupled by a bus 330 to a memory 310, a processor 306, and an I/O interface 308. When the end node 14 is connected to the access node via a fixed link then the I/O interface 308 is employed. Processor 306, under control of one or more routines stored in memory 310, causes the end node 14 to operate in accordance with the methods of the present invention. In order to control operation of the end node 14, memory 310 includes communications routine 323 and end node control routine 325. The end node communications routine 323 is used for controlling the end node 14 to perform various communications operations and implement various communications protocols. The end node control routine 325 is responsible for insuring that the end node operates in accordance with the methods of the present invention and performs the steps described in regard to end node operations and signaling. Memory 310 also includes a MNPS control routine 326. The MNPS control routine 326 is responsible for insuring that the end node operates in accordance with the methods of the present invention and performs the steps described in regard to MNPS operations and signaling. The memory 310 also includes user/device/application/session /resource information 312 which may be accessed and used to implement the methods of the present invention and/or data structures used to implement the invention. In particular, User/Device/Application/Session/Resource information 312 includes MIP visitor state information 313 described in detail in FIG. 4. Information 312 also includes MNPS state 314 that includes addresses of the MNPS when the end node is a MT, or a home address of the MT when the end node 14 is a MNPS, associated security association for securing signaling between the MT and its MNPS, and state indicating whether the MT or the MNPS is presently receiving/sending packets from/to the home address of the end node 14. Information 312 also includes application state 315 that describes the intended behavior of the application software on the MT 14 and the MNPS 14, the application state that is sent from the MT 14 to the MNPS 14, and the classifier information that is sent to a home agent that describes which packet flows are directed to the MT 14 and which flows are sent to the MNPS 14 for the MT 14.

Figure 3:
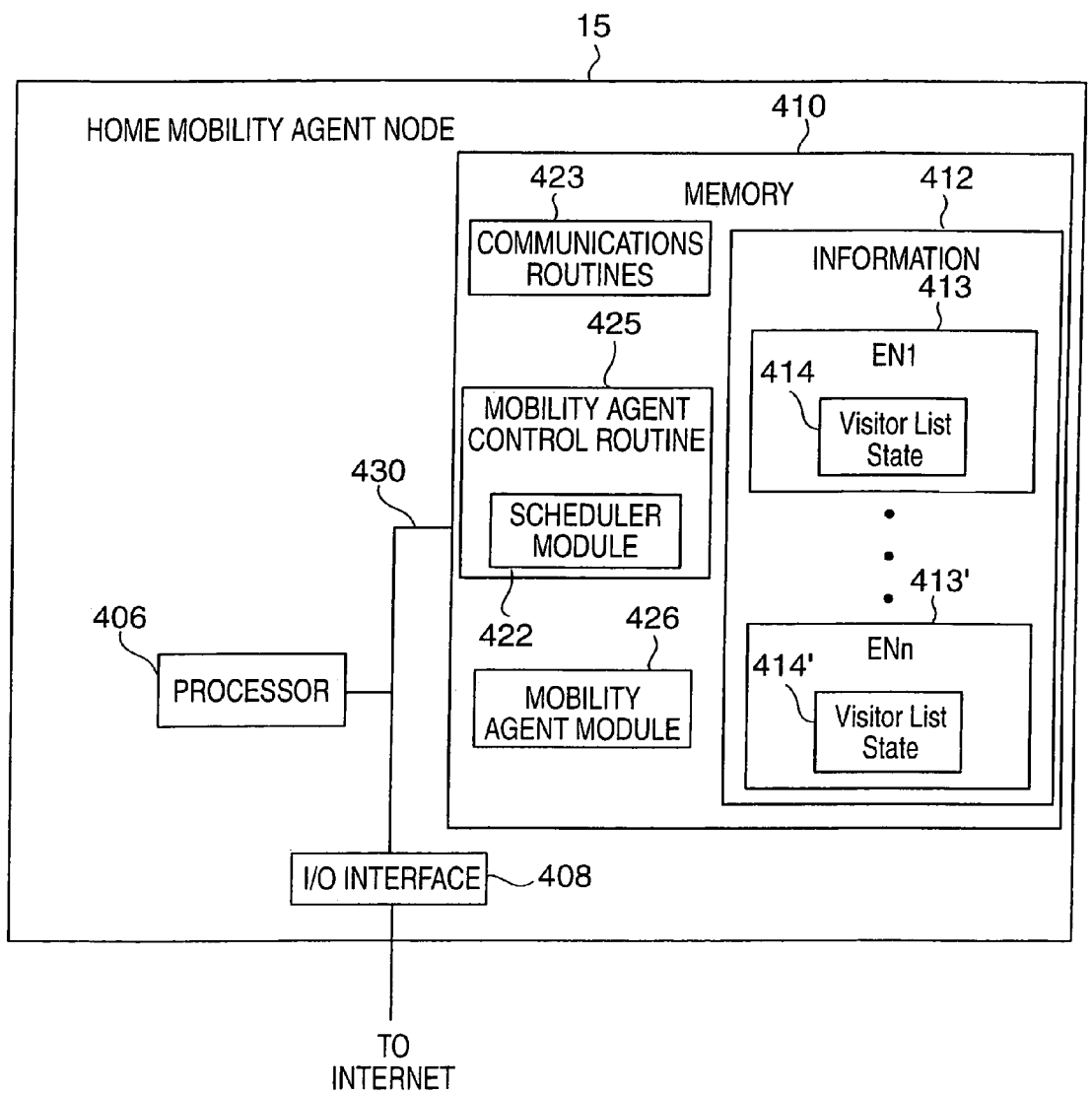
FIG. 3 illustrates an exemplary home mobility agent node implemented in accordance with the present invention.

FIG. 3 illustrates an exemplary home mobility agent node 15 implemented in accordance with the invention. The home mobility agent node 15 includes a bus 430 that couples together an I/O interface 408, a processor (e.g., CPU) 406 and memory 410. The I/O interface 408 couples the home mobility agent node 15 to the Internet. The memory 410 includes routines, which when executed by the processor 406, cause the home mobility agent node 15 to operate in accordance with the invention. Memory 410 includes communications routines 423 used for controlling the mobility agent node 15 to perform various communications operations and implement various communications protocols. The memory 410 also includes a mobility agent control routine 425 used to control the mobility agent node's 15 operation and signaling to implement the steps of the method of the present invention. The mobility agent node control routine 425 includes a scheduler module 422 used to control transmission scheduling and/or communication resource allocation. Thus, module 422 may serve as a scheduler. The memory 410 also includes a mobility agent module 426 used to process and send mobility related signaling implementing the steps of the method of the present invention. Thus, module 426 may serve as a Mobile IP Home Agent. Memory 410 also includes information 412 used by communications routines 423, control routine 425 and mobility agent module 426. The information 412 includes an entry 413, 413' for each active end node (EN1, ENn), respectively. In particular, information for end node 1 413 includes visitor list state 414, shown in detail in FIG. 4. Information about end node N 413' includes visitor list state 414' also shown in detail in FIG. 4

Figure 4:
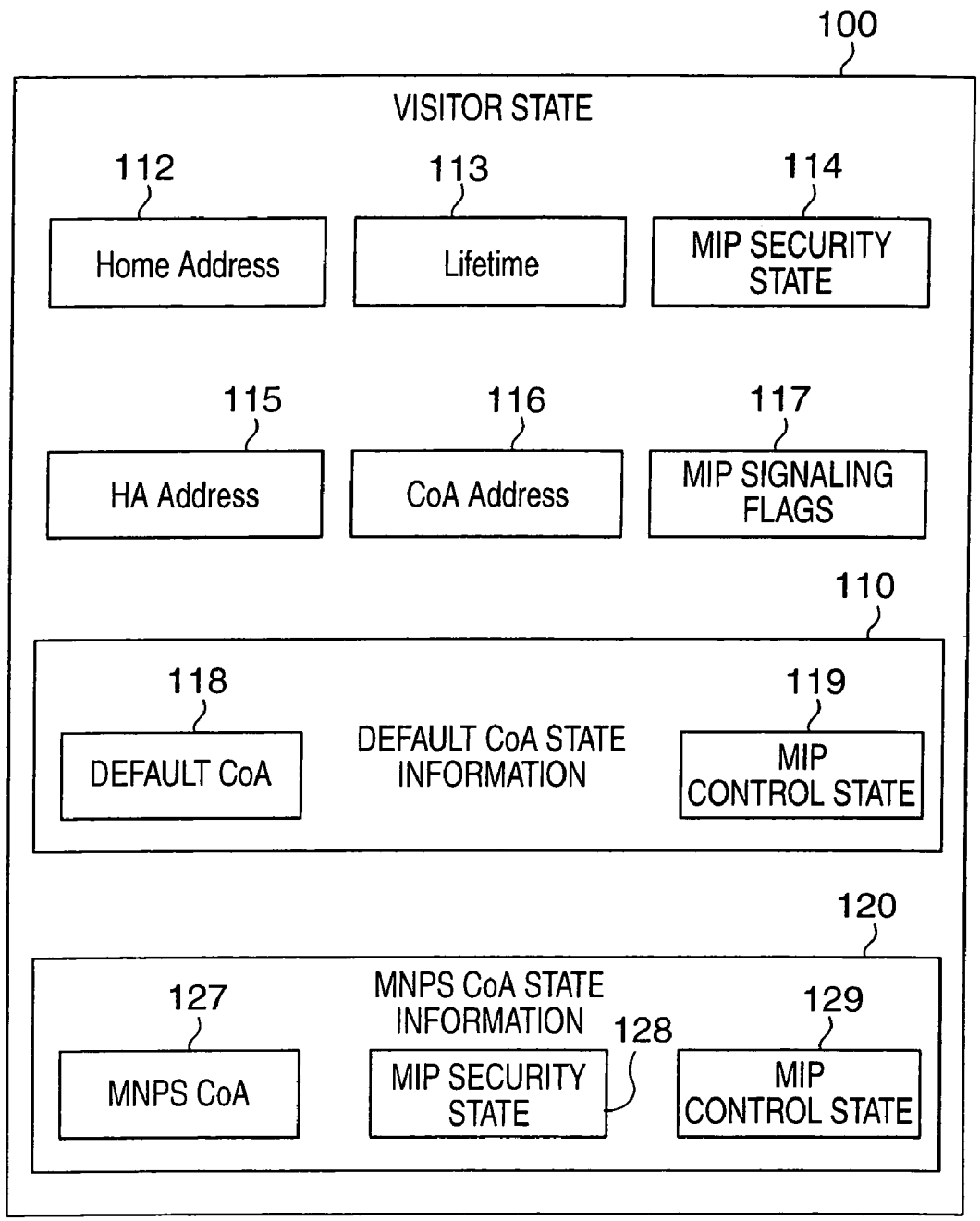
FIG. 4 illustrates the exemplary contents of visitor list state which is exemplary of state that may be included in the visitor list state shown in any one of FIGS. 1, 2 and 3.

FIG. 4 illustrates example visitor list state 100, associated with a given mobility agent such as an end node 14, access node (foreign agent) 12, or a home mobility agent node (home agent) 15, implementing list state 313 in FIG. 2, the visitor list state 214, 214' in FIG. 1, and visitor list state 414,414' in FIG. 3, respectively. From the perspective of the access node 12 and the end node 14 of FIGS. 1 and 2 respectively visitor list state 100 may include a number of state entries 110, 120.

According to this invention Visitor state 100 includes entries for at least one MN 14, each entry including state for a MN home address (HoA) 112, a Home Agent (HA) address 115, a Care of Address (CoA) 116, a binding lifetime 113, MIP signaling flags 117 and MIP security state associations 114 applicable to that mobility agent. When the mobility agent is a home mobility agent then the visitor list state information 100 further includes default CoA state information 110 including the default CoA 118 for an end node 1, e.g., mobile node (MN) or mobile terminal (MT), to be employed by the home agent 15 when the visitor list does not have a valid CoA 116 for the home address 112. Default CoA state information 110 also includes MIP Control State 119 used in the operation of MIP signaling and forwarding between the end node 14 and the home agent node 15. Additionally, when the mobility agent is a home mobility agent then the visitor list state information 100 includes MNPS CoA State information 120 for a home address 112 to be employed by the home agent node 15 when the visitor list is maintained by the corresponding MNPS of a end node 1, rather than the end node 1, e.g. MT, itself. MNPS CoA state 120 includes the MNPS CoA 127 that is employed instead of the default CoA 118 or the end node 1 CoA 116 when the MNPS is issuing MIP registrations to the home agent node 15. State 120 further includes MIP security state 128 to secure such registrations at the home agent, and MIP control state 129 used for the operation of MIP signaling and forwarding between the MNPS 14 and the home agent 15.

Figure 5:
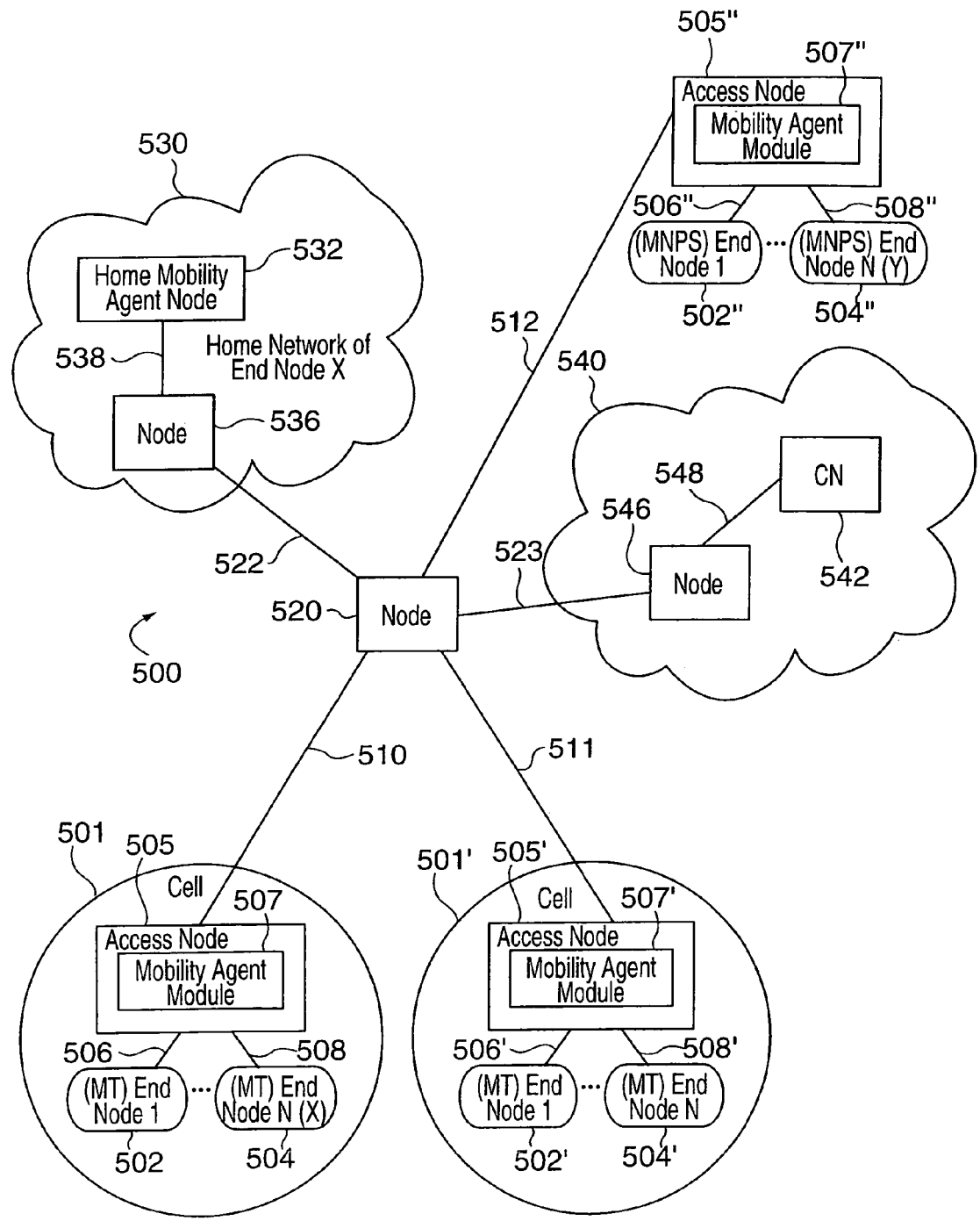
FIG. 5 illustrates a network diagram of an exemplary communications system in which the invention is applicable.

FIG. 5 illustrates an exemplary system 500 comprising a plurality of access nodes 505, 505', 505" implemented in accordance with the present invention. FIG. 5 also depicts communication cells 501, 501', surrounding each access node 505, 505', respectively, which represents the coverage area of the radio technology employed by corresponding access node 505, 505', respectively with end nodes. Access node 505" in contrast employs fixed links to end nodes and hence does not employ a communications cell but is otherwise part of the network. The same physical and functional elements are otherwise depicted in each of the communication cells 501, 501', and the network thus the following description of the elements in the cell 501 surrounding access node 505 is directly applicable to each of the cells 501, 501', and the network portion containing the access node 505". The depiction of the access node 505 is a simplified representation of the access node 12 depicted in FIG. 1. For simplicity access node 505 is shown to include a mobility agent module 507 responsible for the signaling implementing this present invention. FIG. 5 illustrates the access node 505 providing connectivity to a plurality of N end nodes 502, 504 (End Node (MT) 1, End Node (MT) N (X)), via corresponding access link 506, 508, respectively. End nodes 502, 504 are simplified versions of the end node 14 depicted in FIG. 2.

Interconnectivity between the access nodes 505, 505', 505" is provided through network links 510, 511, 512 and an intermediate network node 520. Home network 530 in FIG. 5 is connected to the rest of the system via link 522 and node 520. Home Network 530 further includes network node 536 also connected to link 522 and mobility agent node 532, connected to node 536 via link 538 and operating as mobility agent of at least end node N 504. Network 540 in FIG. 5 is connected to the rest of the system via link 523 and node 520. Network 540 further includes network node 546 also connected to link 523 and a correspondence node (CN) 542, connected to node 546 via link 548 and operating as corresponding node in a data session with at least end node N 504 for illustration of the methods of this present invention. Access Node 505 is considered to support mobile terminals (MTs) in the communications network 500 providing wireless communications, e.g., via links (506, 508) with end nodes (end node (MT) 1 502, end node (MT) N (X) 504). Similarly, access node 505' is considered to support MTs in the communications network 500 providing wireless communications, e.g., via links (506', 508') with end nodes (end node (MT) 1 502', end node (MT) N 504'). In contrast, the access node 505" is considered to support fixed links to end nodes that are MNPSs which further support the end nodes that are MTs in the communications system 500. Access node 505" is shown to be coupled via fixed links (506", 508") to end nodes (end node (MNPS) 1 502", end node (MNPS) N (Y) 504"), respectively.

Figure 6:
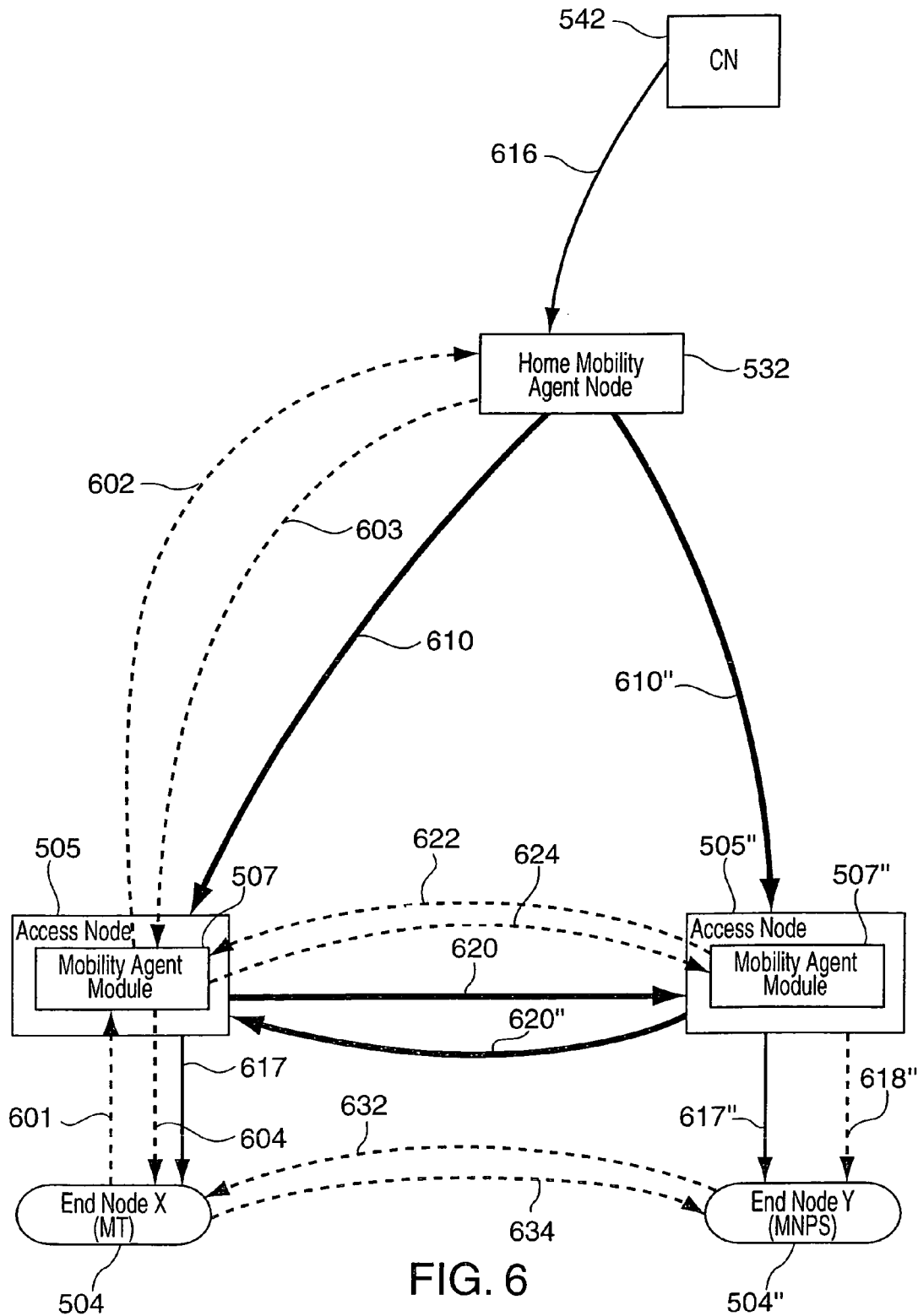
FIG. 6 illustrates exemplary signalling and packet flows for the network of FIG. 5.
Figure 7:
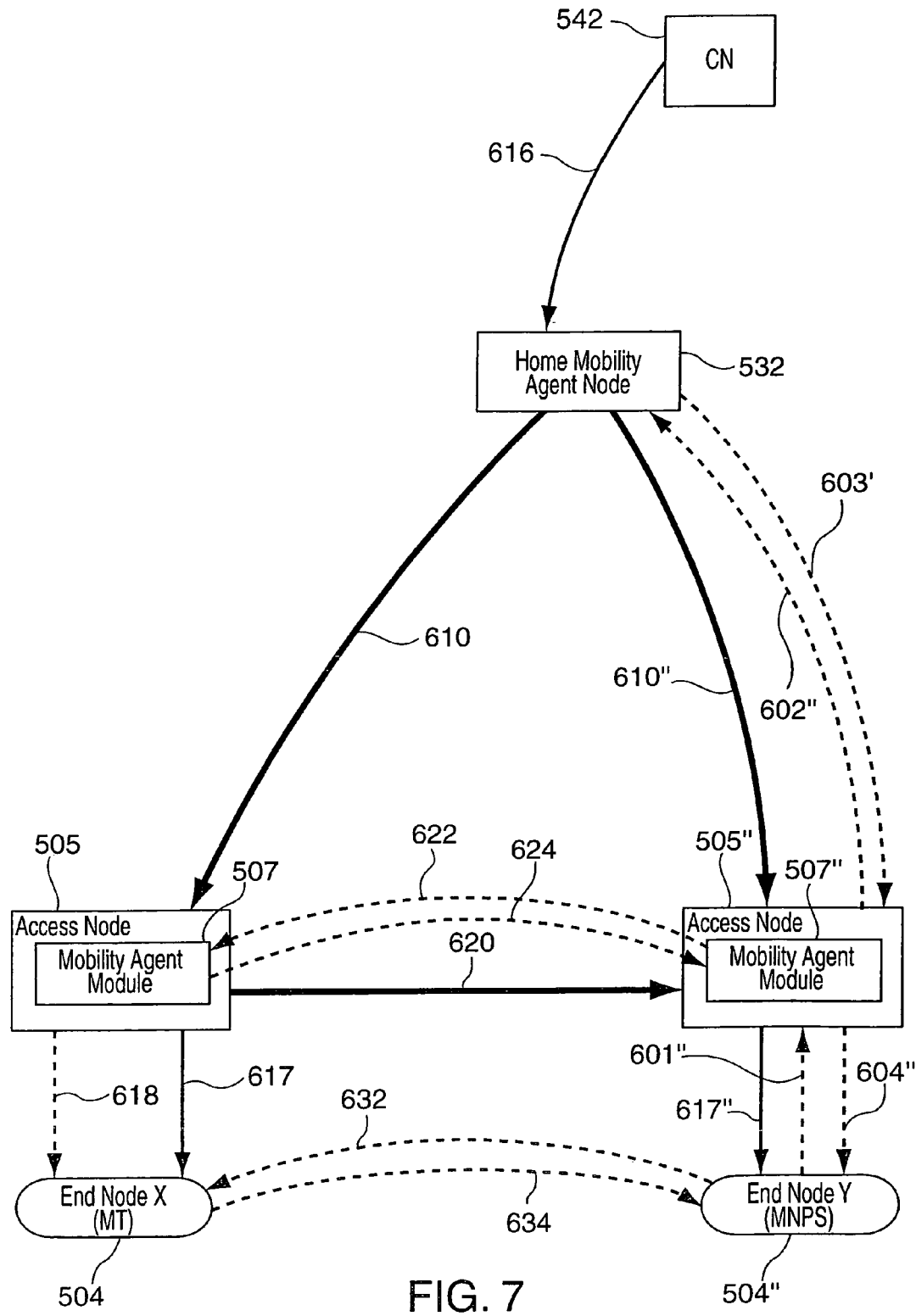
FIG. 7 illustrates a second exemplary signalling and packet flows for the network of FIG. 5.
Figure 8:
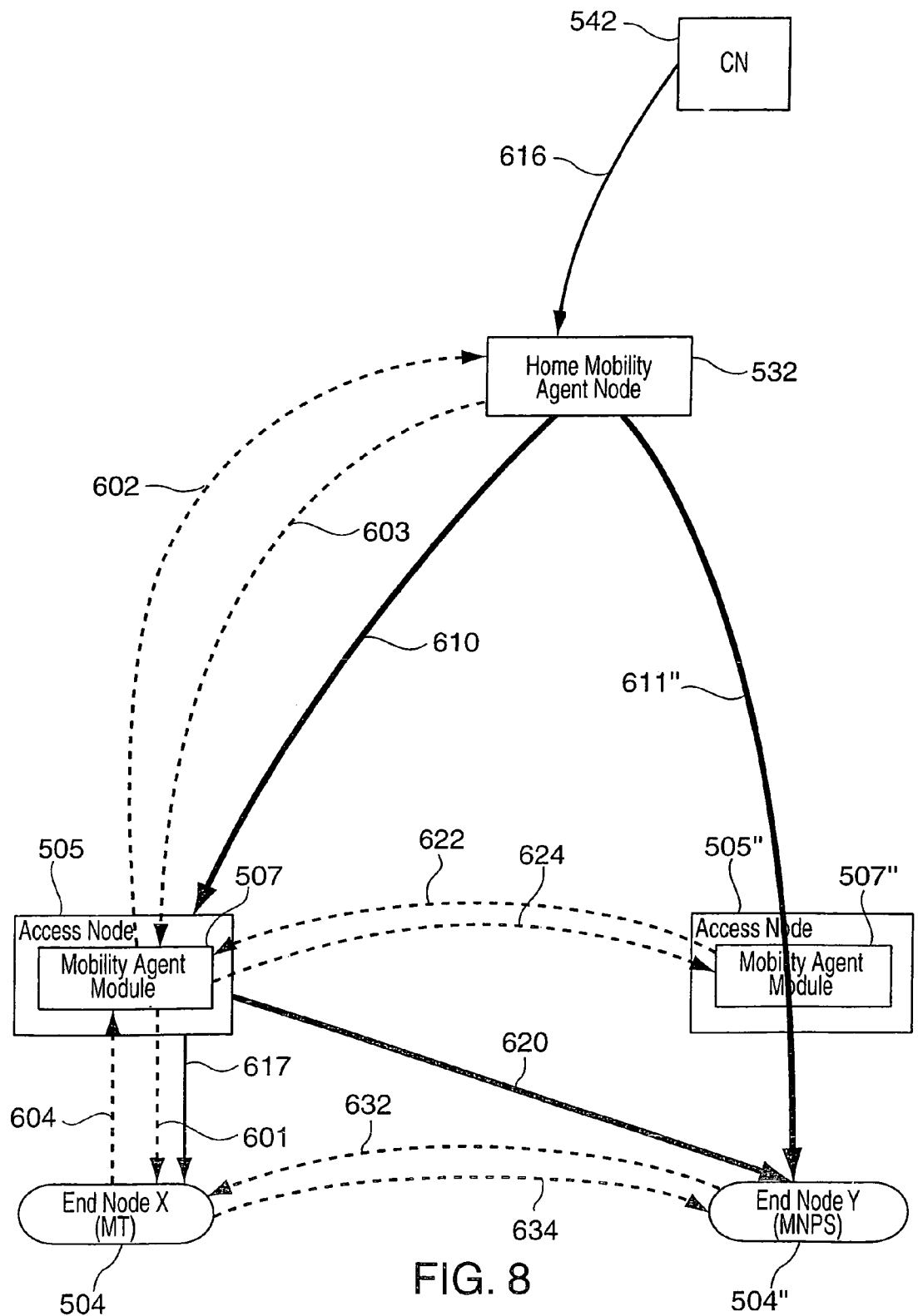
FIG. 8 illustrates another exemplary signalling and packet flows for the network of FIG. 5.

FIGS. 6-8 illustrate example embodiments of the various methods of this present invention. FIGS. 6-8 are simplified versions of the system FIG. 5 including elements as required to further explain this present invention. FIG. 6 shows access nodes 505, 505", including mobility agent modules 507, 507", respectively, providing access to MT end node X 504, and MNPS end node Y 504" that provides functionality to the MT end node X 504. FIG. 6 also shows home mobility agent node 532 serving end node (MT) X 504 and a CN node 542 being in a communication session with said end node (Mff) X 504. In FIG. 6 solid thin arrows depict inner data traffic and the direction of the arrow points to the destination of said data traffic; thick solid lines depict encapsulated inner data traffic and the direction of the arrow points to the destination of said tunnel; dashed lines depict signaling messages used for the registration of an end node to the foreign mobility agent 507 and the home mobility agent 532, and the direction of the arrow points to the destination of said signaling. Dashed lines are also used for other types of signaling associated with MIP hand-off and with controlling the MNPS functionality.

FIG. 6 shows the packet forwarding and signaling for an exemplary example of the invention in operation in network 500. The dashed arrows indicate signaling messages and the solid arrows are packet flows. The thin solid arrows are inner packets whilst the thick arrows are encapsulated inner packets using an outer header. In FIG. 6, end node (MT) X 504 is initially receiving packets from the CN 542 as packet flow 616 to the home mobility agent node 532, which tunnels these packets to the access node 505 as packet flow 610, and then the foreign agent 507 in the access node 505 then decapsulates the packets 610 and forwards them as packets 617 to the end node (MT) X 504. When the end node (MT) X 504 wishes to invoke the MNPS functionality of the invention, then the end node (MT) X 504 sends registration request signals 601, 602 towards the home mobility agent 532, via the foreign agent 507 and receives the registration reply via messages 603 and 604. The registration message 601 includes the home address of the end node (MT) X 504, the address of the mobility agent node 532, the address of the access node 505, the end node X CoA field for the home address of the end node (MT) X 504, and the requested lifetime of the registration. The registration message is intended to cancel the binding between the home address and the CoA of the end node (MT) X 504 in the foreign and home agents 507, 532. To achieve this, without loss of generality, the CoA may be set equal to the home address and/or the lifetime is set to zero or a very short time value. When the dynamic binding between the home address and dynamic CoA is cancelled or replaced by the end node (MT) X 504 in the home agent 532, then the home agent replaces the dynamic CoA entry with the default CoA entry in the binding. The default CoA is either preconfigured into the home agent via a management process, can be delivered in the MN profile from a policy server, or can be dynamically configured by the end node (MT) X 504 by including a default CoA in this or a previous registration message. The default CoA is permanent and is only removed from the home agent mobility node 532 when the default CoA functionality is no longer applicable such as when the home address is no longer allocated to end node (MT) X 504. The home agent 532 then tunnels packets that arrive for the home address of end node (MT) X 504 to the default CoA of end node (MNPS) Y 504" rather than to the dynamic CoA of the end node (MT) X 504. The default CoA in FIG. 6 is the address of the agent node 505" to which the end node (MNPS) Y 504" is connected. End node (MNPS) Y 504" is the MNPS of the end node (MT) X 504 such that packets addressed to the home address of the end node (MT) X 504 are now delivered to end node (MNPS) Y 504" where the application proxy for that end node (MT) X 504 is located. The forwarding at the access node 505" is preconfigured with a binding between the home address of the end node (MT) X 504 and the end node (MNPS) Y 504" so that the access node 505" can decapsulate the packets from the home agent 532 and forward them as packets 617" to the end node (MNPS) Y 504". The end node (MNPS) Y 504" becomes the network end point for packets 617 addressed to the home address of the end node (MT) X 504 whilst the default CoA is active at the home agent 532.

In a further embodiment, the home mobility agent node 532, foreign mobility agent 507", end node UPS) Y 504" or any intermediate node that is on the path of the packet flow between the home agent 532 and the end node (MNPS) Y 504", can act as a Network translator and convert the destination address of the packets in the packet flow from the home address of the end node (MT) X 504 to the interface address of the end node (MNPS) Y 504" so that the end node (MNPS) Y 504" application proxy can avoid re-using the home address of the end node (MT) X 504 as a network address.

These features of the invention enable an end node (MT) X 504 to redirect its packets to an end node (MNPS) Y 504" under the control of the end node (MT) X 504 and its home agent 532.

The end node (MNPS) Y 504" receives the packets 617" and undertakes the processing of the packets and the application data within the packets, as if it was the end node (MT) X 504. The end node (MNPS) Y 504" has an interface that matches the destination address of packets 617" and passes the application data contained in the packets to the application software in the application proxy that is configured to process said packet data. The processing of the packet data is controlled by application proxy configuration state which enables the MNPS at end node Y (MNPS) 504" to provide services on behalf of the MN in the end node (MT) X 504 to CN 542. These services include the ability to generate application data, create packets and send said packets to the CN 542 as part of the ongoing communications session, or to any other end node including the end node (MT) X 504. In addition, the application proxy is able to send and receive signaling data in signaling packets that can be used to create, maintain and terminate communications sessions with CNs.

Signaling or application data packets generated by the end node (MNPS) Y 504", on behalf of the end node (MT) X 504, as part of the session with the CN 542, are typically returned to the CN 542 using the reverse path and associated processing through the foreign agent 507" and Home agent 532. Where alternative nodes other than the home agent 532 have the dynamic CoA state, such as is the case with the CN 542 when employing Mobile IP Route optimization (http://www.ietf.org/proceedings/99nov/I-D/draft-ietf-mobileip-optim-08.txt), then the CN 542 may additionally have the default CoA state described in this invention.

In a further embodiment of the invention, the home agent 532 can have a filter associated with the default CoA for a home address of an end node (MT) X 504 that identifies a specific subset of packets addressed to that home address that are to be forwarded to the default CoA when a dynamic CoA is not active. The application proxy at the end node (MNPS) Y 504" is able to provide applications services for said subset of packets without having to support other possible applications that can be employed by the end node (MT) X 504. The filter can be configured or delivered using any of the methods employed for the default CoA. Similarly, the application proxy configuration can include filters that limit the type of applications packets can be emitted by the application proxy from the source address of the end node (MT) X 504, or any associated source address that is translated into the home address of the end node (MT) X 504. Further, a filter can alternatively be installed into the foreign agent 507" to police packet flows in either direction between the CN 542 and the end node (MNPS) Y 504".

In a further embodiment of the invention, the message 601 can include the address of the access node 505" and an instruction to trigger message 624 and acknowledgment 622 which causes the context state associated with the end node (MT) X 504 at the access node 505 to be transferred to the access node 505" so that the access node 505" can police and provide services to the packet flow 617" and the end node Y (MNPS) 504", as is provided by the access node 505 to the end node (MT) X 504 and packets 617. Specific context state examples are the policy profile, the paging classifier, Multicast group membership and security associations needed by the access nodes 505, 505" for the end node (MT) X 504. Alternatively, this context state can be preconfigured in the access node 505" via a similar policy process such as AAA signaling that is used to deliver the context state to the access node 505, and the message 624 only used to carry incremental and/or temporary changes to that preconfigured state. Messages 624 and 622 can also be used to configure a tunnel 620 between access nodes 505 and 505" so that in-flight packets towards the end node (MT) X 504 can also be directed to the end node UPS) Y 504". The message 618" is sent from the access node 505" to the end node (MNPS) Y 504", following message 622/624, to inform end node (MNPS) Y 504" that it is now responsible for the packets to and from the home address of the end node (MT) X 504.

In advance of issuing messages 601 towards the foreign agent 505, the end node (MT) X 504 can issue message 634 to end node (MNPS) Y 504" using the home address of the end node (MT) X 504 as a source address and the interface address of end node (MNPS) Y 504" as the destination address. Message 634 generates a reply message 632. Message 634 is used to request that the end node (MNPS) Y 504" become the end point for packets to and from the home address of the end node (MT) X 504, to which the end node (MNPS) Y 504" responds with an acknowledgement message 632. Message 634 can include modifications to the application configuration at the application proxy in the end node (MNPS) 504", such as application control or data state, as well the filter state which is used by the end node (MNPS) Y 504" to select a subset of packet flows 617 for which the application proxy will process on behalf of the end node (MT) X 504. The reply message 632 can include the address of the access node 505" to which the end node (MNPS) Y 504" is connected so that the end node (MT) X 504 can include that address in message 601 to the access node 505 so that access node 505 knows the address of the access node 505" for the context transfer as part of message 624. Alternatively, both the interface address of the end node (MNPS) Y 504" and its access node 505" can be known in advance at the end node (MT) X 504. Messages 632 and 634 should at least authenticated and integrity protected to avoid the hijacking of packet flows. The end nodes (MT) X 504 and (MNPS) Y 504" therefore share a security association to secure messages between them, tied to the home address of end node (MT) X 504 and the interface address of end node (MNPS) Y 504". This security association can be pre-configured, provided by a policy server or dynamically generated. The end node (MT) X 504 should know its MNPS end node Y 504" interface address in advance of sending message 634 but the end node (MNPS) Y 504" can be dynamically informed of the home address for which it is to provide application proxy services via the contents of message 634.

When end node (MT) X 504 wishes to reclaim the packet flow from the end node (MNPS) Y 504", then the end node (MT) X 504 sends and receives messages 601, 602, 603 and 604 to install into the home agent 532 and foreign agent 507 the dynamic CoA at its current access node 505, 505', which therefore overrules the default CoA at the home agent 532. In advance of this, the end node (MT) X 504 can send message 634 to end node (MNPS) Y 504" to request back the packet flow and to terminate the application proxy in the end node (MNPS) Y 504". The end node (MNPS) Y 504" can then inform the end node (MT) X 504 in message 632 when it is ready (i.e., when application data is at an appropriate stage to transfer control), and can return any associated application control state or data back to the end node (MT) X 504 so that the end node (MT) X 504 can continue with the application processing. Messages 624 and 622 can also be triggered by message 601 at the access node 505 to this time install a tunnel 620" back to the access node 505, for in-flight packets towards the access node 505" for the end node (MNPS) Y 504", creating the reverse of packet flow 620. Messages 624 and 622 can also recover the context state from access node 505" including any changes that have occurred at access node 505", back to access node 505. This enables the access node 505" to act as a temporary storage point for the context state if the end node (MT) X 504 should leave access node 505 causing that access node to eliminate said context state associated with that end node (MT) X 504. Message 618" is used to inform the end node (MNPS) Y 504" that it is no longer responsible for the set of packets to and from the home address of the end node (MT) X 504.

FIG. 7 shows an alternative embodiment of the invention that uses a MNPS CoA in the home agent 532 instead of the default CoA. This time it is the end node UPS) Y 504" that sends the registration signals to the home agent 532 via the foreign agent 507" as messages 601" and 602" which include the home address of end node (MT) X 504 and the CoA of the end node (MNPS) Y 504". This results in reply messages 603" and 604" along with the update of the binding in the home agent 532 to redirect packets from tunnel 610 to tunnel 610". The end node (MNPS) Y 504" is then able to redirect packets addressed to the home address away from the end node (MT) X 504. The end node (MNPS) Y 504" and foreign agent 507" should share a security association with the home agent 532 to secure these messages to avoid redirection attacks from unauthorized nodes. Note that the registrations from end node (MNPS) Y 504" do not eliminate the registration state issued by the end node (MT) X 504 itself, both of which are treated independently, but the registration state and specifically the CoA from the end node (MNPS) Y 504" is prioritized above that of the end node (MT) X 504. This is so that the end node (MNPS) Y 504" can safely redirect the packet flows of an end node (MT) X 504 when it is disconnected from the network or suffering a malfunction.

This time message 601" triggers message 622 which has a reply message 624. These are once again used to install temporary packet forwarding 620 between the access node 505 and the access node 505" and to fetch the context state from the access node 505. Similarly, messages 601", 602", 603", 604", 622 and 624 are used to redirect packet flow back to the end node (MT) X 504, and its access node 505, by canceling the MNPS CoA in the home agent 532, when the end node (MNPS) Y 504" no longer wishes to receive packets for the home address of end node (MT) X 504. Message 618 is used to inform the end node (MT) X 504, as a result of messages 622, 624 whether or not it is presently responsible for packets to its home address. The end node (MT) X 504 can trigger the end node (INPS) Y 504" to send message 601", to either take or release the redirection of the packets, by first sending message 634 to the end node (MNPS) Y 504" which again responds with message 632. Other nodes such as the access node 505, CN 542 or home agent 532 can alternatively trigger the end node (MNPS) Y 504" to issue message 601" using messages similar to message 634.

FIG. 8 is the same as FIG. 6 apart from the fact that the MNPS CoA of end node (MNPS) Y 504" is this time a Co-located CoA which is equal to the interface address of end node (MNPS) Y 504". Redirected packet flow 611' is therefore now a tunnel directly between the home agent 532 and the end node (MNPS) Y 504", which avoids the need for the access node 505" needing a foreign agent function 507". In addition, in-flight packets 620 can be sent directly to the CCoA of the end node (MNPS) Y 504" rather than via the access node 505". However, if it is the end node (INPS) Y 504" that issues the message 601" as in FIG. 7, rather than the end node (MT) X 504 as in FIG. 6, and that registration should be sent via the access node 505" or in-flight packets 620 are still sent to the access node 505, then the foreign agent 507" may still be required.

Figure 9:
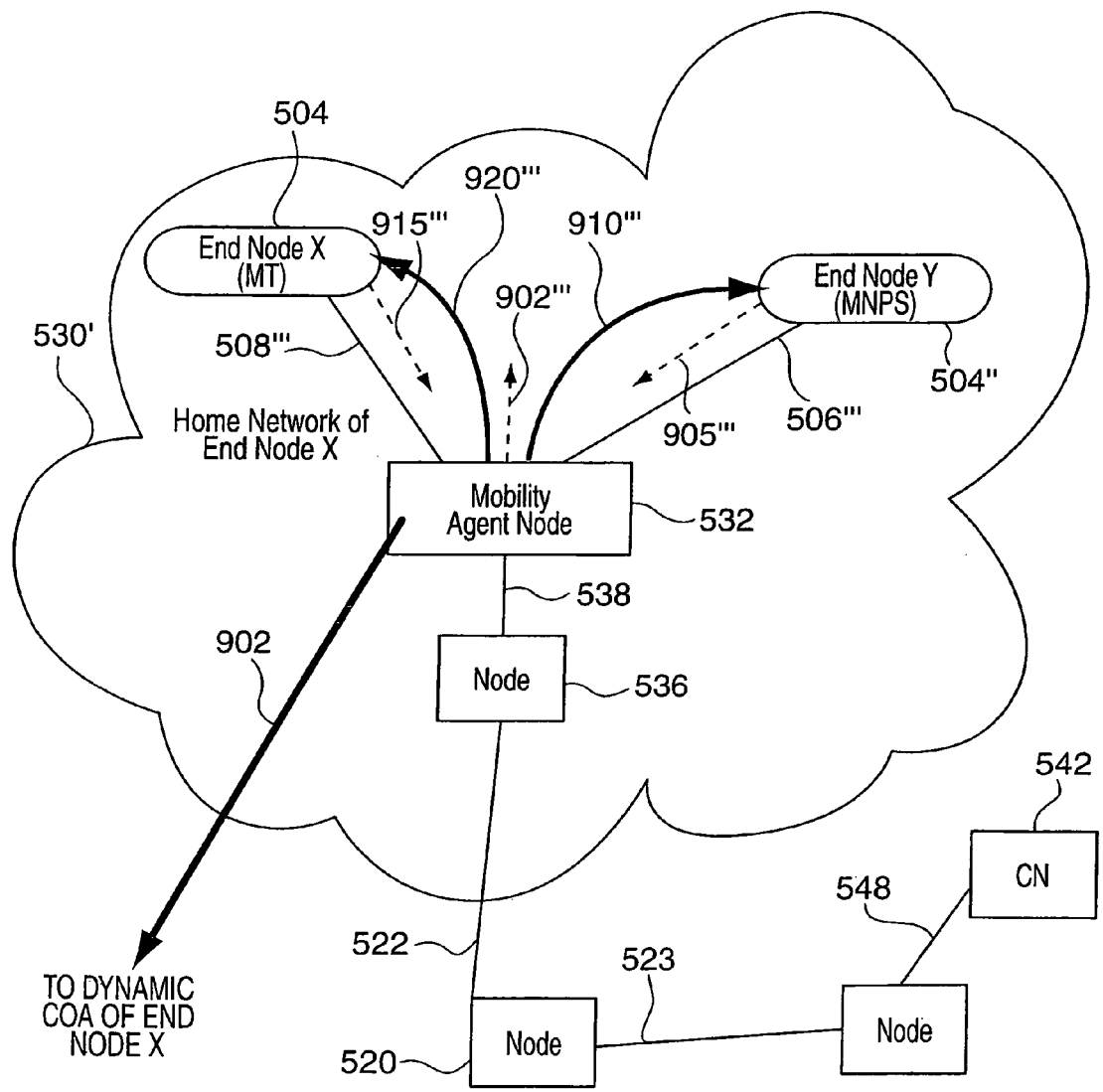
FIG. 9 illustrates a network diagram for an alternative exemplary communications system in which the invention is applicable, along with exemplary signalling and packets flows associated with said network.

FIG. 9 shows an alternative embodiment of the default CoA functionality in the special case that the end node (MNPS) Y 504" is on the same mac_layer network as the home agent 532, which is therefore also the home network 530' of the end node (MT) X 504. The FIG. 9 shows the networking between the CN 542 and the network 530 components of FIG. 5. FIG. 9 introduces links 508''' and 506''' which are used to connect end node (MT) X 504 and end node (MNPS) Y 504" to the home agent 532. The nodes run a protocol which distributes the mapping between the mac_layer address of each interface and its associated IP address, such as in the case of Address Resolution Protocol (ARP) or Neighbour Discovery in IPv6 (ND). When the end node (MT) X 504 is not on the home network 530' but is connected to a foreign access node such as 505, and the end node (MT) X 504 has a dynamic CoA in the home agent 532, then the home agent will send a proxy ARP signal 902''' with a mapping between its mac_layer address and the home address of the end node X 504, to indicate that packets addressed to that home address should be forwarded to it by nodes on the mac_layer network. The home agent 532 then tunnels these packets to the current registered dynamic CoA as shown by the large solid arrow. When however the end node X (MT) 504 is on the home network 530' then it will issue the ARP message 915''' onto the mac_layer network, containing its mac_layer address on link 508''', so that such packets 920''' are instead forwarded to it. This ARP message 915''' cancels the proxy ARP message 902''' from the home agent 532 to all other nodes on the mac_layer network. Note that the home agent will typically not send message 902'''.

In an exemplary embodiment of the invention, the end node (MNPS) Y 504'' can issue for example, without loss of generality, a proxy ARP message 905''' to redirect packets to the home address of the end node (MT) X 504, towards the end node (MNPS) Y 504'' creating packet flow 910'''. This reproduces the redirection functionality of the MNPS CoA in the limited case of the end node (MNPS) Y 504'' being on the home network. The proxy ARP messages: 902''' sent by the home agent 532, 915''' sent by end node(MT) X 504, and 905''' sent by end node (MNPS) Y 504'' can be strictly ordered using a priority flag in the ARP messages, or the last message can instead be considered the latest configuration and a system of message suppression using internal priorities used by the nodes to identify who is the present receiver of packets addressed to the home address of end node (MT) X 504. The default CoA capability can be reproduced in this special case by instead storing a default ARP binding in the home agent 532 which is activated when the end node (MT) X 504 is neither on the home network nor has a valid dynamic CoA registered in the home agent 532. The default ARP binding is then advertised by the home agent and identifies the mac_layer address of the end node (MNPS) Y 504'' rather than the mac layer address of the home agent 532.

Various alternative embodiments exist in the implementation of the invention. Firstly, the access node 505'' can contain the home agent 532 whilst still using default and MNPS CoA features. In addition, it is possible for there to be multiple MNPSs for each home address, with filters used to route packets to the correct MNPS functionality for each subset of the packet flows. One of said MNPSs can also be located in the same node as the home agent 532. In addition, the MNPS software can be located in the access node 505''. The invention can use Mobile IP v4 and/or v6 signaling and forwarding, including the various forwarding options including route optimisation. The various messages detailed in the invention can be used in various subsets and combinations as appropriate to the requirements of the application proxy in relation to the subset of packets being redirected from the end node (MT) X 504.

Some example application proxy features will now be described.

Firstly, the default CoA can be used to redirect all packets to an allocated home address, that does not have a registered dynamic CoA in the home agent 532, towards an application proxy that acts as an error-logger by simply capturing the packet headers.

Secondly, an extended IP paging system can be supported whereby the end node (MT) X 504 can go into sleep at the access node 505 and packets can be redirected to the access node 505'' where a paging classifier is contained in the context state of the end node (MT) X 504. The paging classifier can decide whether packets are dropped, forwarded to the MNPS or trigger a paging message to the present location of the end node (MT) X 504, said location being accessible by the access node 505''. Packets that are forwarded to the end node (MNPS) Y 504'' are processed in the MNPS and application events can then trigger message 601'' to return packet forwarding to the end node (MT) X 504 at its present location which is installed as the CoA in the home agent 532 using message 602''. Alternatively, the MNPS can simply send message 632 towards the end node X 504 which will be passed to the access node 505'' and will then trigger the paging function at that access node towards the present location of the end node (MT) X 504. The potential result of the paging function is the end node (MT) X 504 will wake up and wish to recover its packet reception and forwarding. It will therefore use message 601 to update the home agent with its present CoA, trigger 622/624 to recover its context state from the access node 505'' and use message 634 and 622 to recover its application state from the MNPS.

Whilst the end node (MT) X 504 is asleep, the MNPS can issue keep-alive packets for any applications and protocols at the CN that require such keep-alives to maintain a session. The message 634/632 exchange is used by the end node (MT) X 504, along with preconfigured application proxy state, to inform the MNPS of the sessions to be refreshed, the refresh interval, any security state used to secure the keep-alive signalling, the keep-alive peer and the response behaviour if the session terminates or if incoming data packets arrive on that session. This enables the end node X (MT) 504 to go into power efficient extended sleep but not lose connectivity to application servers and networking gateways.

In a third application of the invention, a content distribution system can be developed whereby the end-node (MT) X 504 can order delivery of a piece of content but direct its delivery to the MNPS in the end node (MNPS) Y 504'' using a filter in the home agent 532. The application proxy state in the MNPS can then direct a message to the end node (MT) X 504 when the content has been delivered in its entirety, or simply wait for the end node (MT) X 504 to query its delivery status. The end node (MT) X 504 or end node (MNPS) Y 504'' can then use the methods of the invention to direct packets back to the end node (MT) X 504 and then the end node (MNPS) Y 504'' can deliver the content to the end node (MT) X 504. This enables the end node X (MT) 504 to either go to sleep or use its bandwidth for other purposes whilst the content is delivered to end node (MNPS) Y 504'', and then request delivery when it best suits that end node (MT) X 504.

In an alternative, content distribution system, the end node (MNPS) Y 504'' can act as a content server for content from the end node (MT) X 504. The end node (MT) X 504 can then wake-up and efficiently deliver a content update to end node (MNPS) Y 504'' whilst using filters to direct content requests to the content server at the end node (MNPS) Y 504''. This avoids the end node (MT) X 504 from having to publish its content from either itself, or a fixed node, ensuring that the content is served locally. It also means that the server address is the same whether or not the end node (MT) X 504 or end node (MNPS) Y 504'' is actually serving the content, so enabling the end node (MT) X 504 to serve a subset of flows, some or all of the time as it so wishes. Messages 634/632 keep the end node applications in synch whilst messages 601, 602, 603, 604, 622, 624 and 618 manage the packet forwarding.

Figure 10:
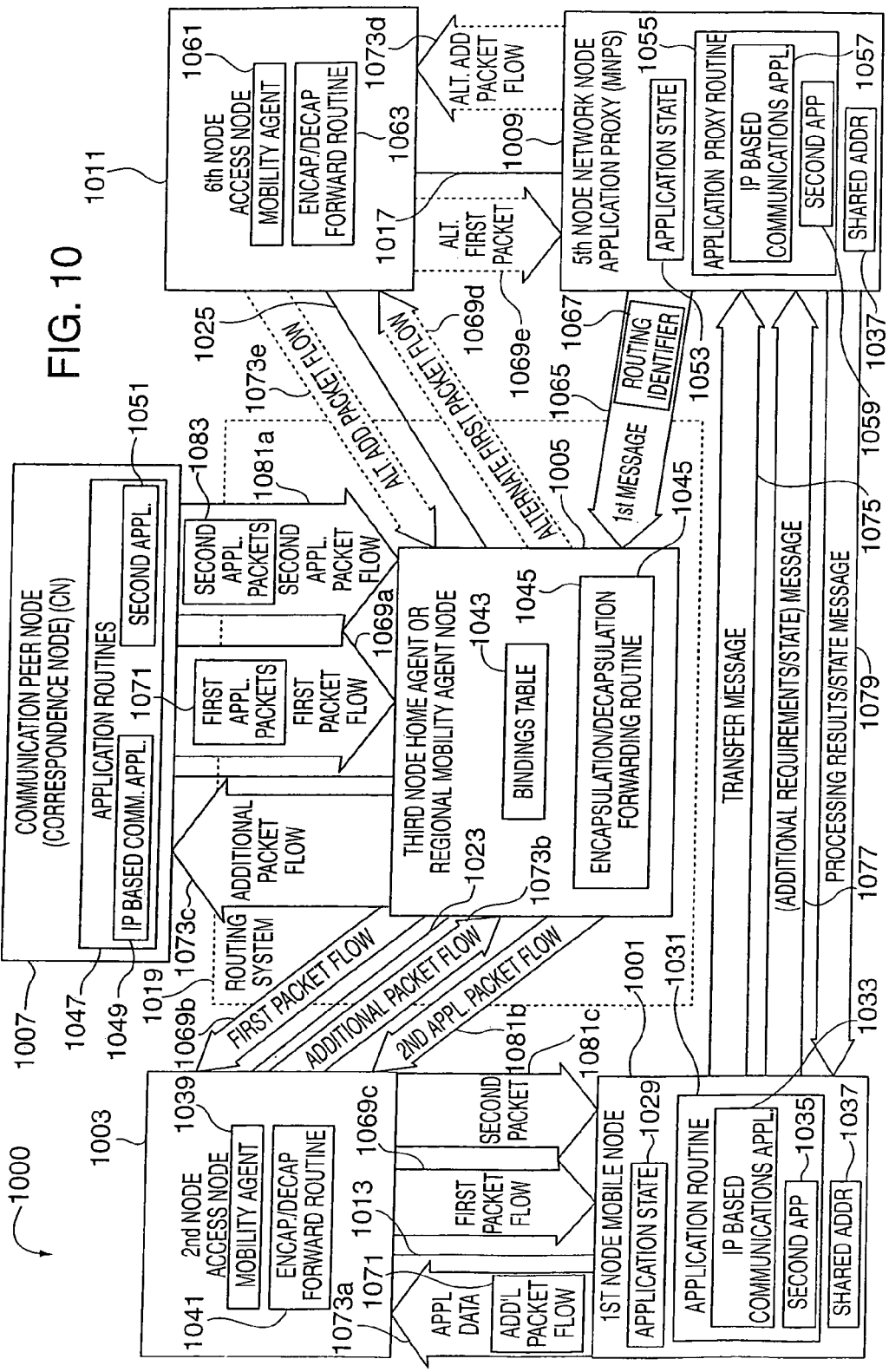
FIG. 10 illustrates yet another exemplary communication system and related signalling.

FIG. 10 illustrates an exemplary communications system 1000 in accordance with one particular exemplary embodiment of the present invention. The system 1000 includes a first node, e.g., mobile node 1001, a second node, e.g., access node 1003 which may be used as a MIP Foreign Agent, a third node, e.g., a regional mobility agent node 1005 which may be a MIP home agent, a fourth node, e.g., a communication peer node 1007 sometimes called a correspondence node, fifth node, e.g., a network node 1009, and a sixth node, e.g., an access node 1011. Mobile node (MN) 1001 is coupled to access node 1003 via wireless link 1013. Network node 1009 is coupled to access node 1011 via link 1017. Home Agent or Regional Mobility Agent Node 1005 is included in a routing system 1019. Home Agent or Regional Mobility Agent Node 1005 is coupled to Access Node 1003, Access Node 1011, and Communication Peer Node 1007 via links 1023, 1025, 1027 respectively. Access Nodes 1003, 1011 are normally part of the routing system 1019. Second node, e.g., access node 1003, has a defined route, e.g., a route defined by a routing table included in internal memory, which is used to forward packets with a CoA corresponding to said mobile node 1001 to said mobile node. Sixth node, e.g., access node 1011, has a defined route, e.g., a route defined by a routing table included in internal memory, which is used to forward packets with a CoA corresponding to said mobile node 1001 to said fifth node 1009 the Mobile Node proxy Server (MNPS), when the MNPS is responsible for processing application packets corresponding to the shared address common to both the MN 1001 and MNPS 1009. The various nodes may be located in different addressing domains, with addresses associated with said different domains including different address prefixes used to distinguish between the different addressing domains. The system 1000 includes at least two addressing domains but may include more, e.g., 3 addressing domains. The Home mobility agent node 1005 is normally located in a different domain from the FA node, e.g., the second node 1003, and the FA node 1003 is normally located in the same domain as the regional mobility agent 1005. The other nodes 1011, 1009 may be in the same domain as the FA node 1003 or home agent 1005, or located in a different domain altogether, e.g., a third addressing domain which is identified by a third prefix which is included in addresses corresponding to nodes located in the third addressing domain.

MN 1001 includes application state 1029, and application routines 1031 including an IP based communication application 1033 and a second application 1035, and a shared address 1037. Access node 1003 includes a mobility agent 1039 and encapsulation/descapsulation and forwarding routine 1041. Access node 1003 may be a base station or access router used by MN 1001. Mobility Agent 1039 may act as a Foreign Agent (FA) for MN 1001 while MN 1001 is in the foreign domain in which Access Node 1003 is located. Home Agent or Regional Mobility Agent Node 1005 includes a bindings table 1043 and an encapsulation/descapsulation forwarding routine 1045. Life time information may be included with the address binding information included in bindings table 1043. Node 1005 may act as the Home Agent (HA) for MN 1001. Communication peer node 1007 includes application routines 1047, e.g., software applications, including an IP based communications application (first application) 1049 and a second application 1051. Fourth node 1007 is the correspondence node (CN) to which MN 1001 is corresponding with in an exemplary communications session in which the first application 1033 is involved. Network Node 1009 operates as an application proxy during at least some period of time when the MN 1001 is unavailable to continue interacting with a first application, and may be a Mobile Node Proxy Server (MNPS). As part of acting as an application proxy the MNPS 1009 receives packets corresponding to an application flow which have a destination address corresponding to the MN 1001 and processes the received packets. Processing may include generating at least one packet from the body of two received packets and transmitting the generated packet to the CN 1007. Node unavailability may be the result of a decision by the MN 1001, e.g., to enter a sleep state or due to an event outside the control of the MN 1003 such as signal loss due to interference. When Node 1009 is acting as a MNPS, node 1009 may communicate with CN 1007 in place of MN 1001. In order for application processing and control to be passed between the MN 1001 and MNPS 1009 application state, e.g., information on the current status of application processing and/or results of processing packets received from the CN 1007, are exchanged between the MN 1001 and MNPS 1009. This may involve handing application processing off to the MNPS 1009 and then handing back application responsibility to the MN 1001 along with the state indicating where the MNPS 1009 left off in regard to application processing. Responsibility for different applications may be handed-off between the MN 1001 and MNPS 1009 at different times. Routing control signals sent to the routing system 1019 are used to insure that a flow of packets corresponding to an application is routed to the MN or MNPS responsible for processing the packets corresponding to the particular application at any given point in time. Thus, different packet flows, corresponding to different MN applications 1033, 1035 can be classified by the routing system 1019 and routed to different nodes. In fact, different NMS nodes 1009 may be used to support different applications on behalf of the MN 1001 when the MN is unavailable. In addition, while the MN may be unavailable for one application it can continue to processes packets relating to another application. Thus, responsibility for one or more subsets of the applications 1033, 1035 which the MN is actively using, may be handed off to the MNPS 1009 at different points in time. The correspondence node 1007 need not be informed as to whether the MN 1001 or MNPS 1009 is receiving and processing packets corresponding to a particular application and may continue operation under the assumption that it is interacting with the MN 1001 in regard to a particular application at all times. As will be discussed below, signals to the routing system 1019 regarding redirection of packets corresponding to a particular application associated with the MN 1001 may be sent to the RS 1019 from either the MN 1001 or MNPS 1009. These signals normally include a routing identifier which identifies the node 1001 or 1009 to which the application packets are to be directed. In some cases, the routing identifier identifies an intermediate node, e.g., FA 1003 which has a determined route to the node to which the application packets are to be directed. In such cases, the identified intermediate node receiving the packets intended for the MN or MNPS, forwards the packets to the destination node, e.g., the MN or MNPS with which it has the routing relationship. This relationship will normally be reflected in binding tables used to route packets to the MN or MNPS which is included in the intermediate node 1003 or 10011. The routing identifier sent to the RS 1019 may be, e.g., an address corresponding to the MN or MNPS or a combination of an address and some other routing information such as a weight used to affect a routing decision made by the RS 1019. The routing identifier may further optionally include additional information, such as a packet classifier, to enable the routing system to detect packets belonging to the first or second applications 1049, 1051 at the CN 1007, and to direct the first and second application packets to different Nodes 1001, 1009. When the packet classifier is missing from the routing identifier, then the routing system redirects all packets in the first packet flow 1069 to the identified node in the routing identifier.

Node 1009 includes application state 1053, application proxy routines 1055 including an IP based communication application proxy routine corresponding to the first application 1057 and a second application proxy routine 1059 corresponding to the second supported application, and shared address 1037. Shared Address 1037 corresponds to both MN 1001 and network node (MNPS) 1009. Access Node 1011 includes a Mobility Agent 1061 and an Encapsulation/Decapsulation forwarding routine 1063. Access Node 1011 couples network node 1009 to the rest of the system 1000.

During system operation, in accordance with the present invention, MN 1001 or Network Node (MNPS) 1009 sends a first message 1065 to the Routing System 1019 and its node 1005. FIG. 10 shows Message 1065 being sent by network node (MNPS) 1009. First Message 1065 includes a routing identifier 1067. Routing identifier 1067 uniquely identifies a node being in the group of nodes including MN 1001, network node (MPS) 1009, and a node having a defined route to MN 1001 or MNPS 1009 such as the second node 1003 and $6^{th}$ node 1011. The routing system 1019 directs a first packet flow 1069 from CN 1007, e.g., a flow corresponding to the first application to either MN 1001 or network node (MNPS) 1009. At least some of the packets in packet flow 1069 correspond to first application packets 1071. The node identified by the routing identifier, e.g., one of MN 1001 or network node (MNPS) 1009, receives the first packet flow 1069 at any given point in time. The packet flow is directed to the node 1001 or 1009 which is responsible for application processing and interacting with the CN 1007 at any given point in time. First packet flow 1069 may include, e.g., during a first period of time, first packet flow 1069a from CN 1007 to Home Agent Mobility Node 1005, first packet flow 1069b from Home Agent Mobility Node 1005 to Access Node 1003, and first packet flow 1069c from Access Node 1003 to MN 1001. Alternately, e.g., during a second period of time, first packet flow 1069 includes: first packet flow 1069a from CN 1007 to Home Agent Mobility Node 1005, alternate first packet flow 1069d from Home Agent Mobility Node 1005 to Access Node 1011, and alternate first packet flow 1069e from Access Node 1011 to Network Node (MNPS) 1009.

In the case where MN 1001, receives first packet flow 1069c, IP based communications application routine 1033 processes the received packets and generates additional packets containing application data 1071 as a result of said application processing, and transmits the packets in additional packet flow 1073 to CN 1007. Additional packet flow 1073 includes: additional packet flow 1073a from MN 1001 to Access Node 1003, additional packet flow 1073b from Access Node 1003 to Home Agent Mobility Node 1005, and additional packet flow 1073c from Home Agent Mobility Node 1005 to CN 1007. Similarly, in the case where the Network Node (MNPS) 1009 received alternate first packet flow 1069e, IP based communication application proxy routine 1057 processes the received packets and generates additional packets as a result of said proxy application processing, and transmits the packets in additional packet flow 1073 including: alternate additional packet flow 1073d from Network Node (MNPS) 1009 to Access Node 1011, alternate additional packet flow 1073e from Access Node 1011 to Home Agent Mobility Node 1005, additional packet flow 1073c from Home Agent Mobility Node 1005 to CN 1007.

In accordance with one embodiment of the present invention, prior to transmitting first message 1065, a transfer message 1075 is sent from MN 1001 to network node (MNPS) 1009. This message 1075 is used to initiate a transfer of responsibility for processing application packets originating from the CN 1007 from the first node 1001 or fifth node 1009 to the one of the first and fifth nodes which is not responsible at the time of the transfer message 1075 for application processing. Transfer message 1075 may include the routing identifier which identifies the node which is to take over responsibility for application processing. Network node (MNPS) 1009 responds to transfer message by transmitting first message 1065 which includes said routing identifier. Additional Message 1077 from MN 1001 to network node (MNPS) 1009 defines the requirements of the MN 1001 for the processing of packets by the application proxy, network node (MNWS) 1009 and is transmitted when said MNPS 1009 is to take over responsibility for application processing from said mobile node 1001. State Information, for example MN application state 1029 is also included in Message 1077 and may be transferred into MNPS application state 1053. This allows the MNPS to continue application processing from the point at which the MN 1001 transferred responsibility for application processing to the MNPS 1009. A Processing Results/State Message 1079 from network node (MNPS) 1009 to MN 1001 returns information to MN 1001 derived from the processing of packets by the application proxy, network node (MNPS) 1009. The returned information may include a packet, e.g., an application data packet, generated from processing the body of at least two packets corresponding to the first packet flow which are received by the MNPS 1009. This message is sent when responsibility for application processing is being returned to the mobile node 1001 thereby allowing the mobile node to continue application processing from the point where the MNPS 1009 ceased being responsible for application processing.

A second application is supported by CN 1007 through a second application routine 1051. The second application is supported by MN 1001 through the use of a second application routine 1035, and in Network Node (MNPS) 1009 through the use of second application proxy routine 1059. A second application packet flow 1081 including second application packets 1083 is shown in FIG. 10 including: second application packet flow 1081a from CN 1007 to Home Agent Mobility Node 1005, second application packet flow 1081b from Home Agent Mobility Node 1005 to Access Node 1003, and second application packet flow 1081c from Access Node 1003 to MN 1001. Alternatively, the packet flow could have been directed to Network Node (MNPS) 1009 instead of MN 1001 at a different time. The associated messages, signaling, return packet flows, and alternative flows are similar or identical to those described regarding the first application and shall not be repeated for purposes of brevity for the second application. Thus, the routing system can act as a filter sending application packets corresponding to one MN application to the MN proxy 1009 while still sending application packets corresponding to the second MN application to the mobile node 1001. It should be appreciated that mobile node availability may be different for different applications supported by the MN at the same time. Thus, in various embodiments, the first message indicates whether packets corresponding to a particular individual application or applications identified in the message are to be redirected to the identified node or if packets corresponding to all applications supported by the MN 1001 are to be redirected, e.g., to the MNPS 1009. Thus, packets corresponding to different applications may correspond to different packet flows for routing system purposes despite being having a source address corresponding to the CN address and a destination address corresponding to the shared address of the first and fifth nodes 1001, 1009.

In a further embodiment, the third node 1005, fifth node 1009 and sixth nodes 1011 are on the same network and therefore share mac-layer connectivity. Note that in this case the third node and the sixth nodes may be the same node which includes both a home and foreign mobility agent. The fifth node can issue a first message 1065 containing a routing identifier 1067 which is the mac-layer address of the fifth node. This is entered into the binding table 1043 in the third node as the current mac-layer CoA for the first packet flow such that packets are forwarded to the fifth node via the mac-layer address of the fifth node. Further, this mac-layer CoA can also be stored in the binding table 1043 as a default mac-layer CoA such that when the lifetime of binding table entry pointing to the second address (CoA) of the first node at the second node expires, then packets are automatically diverted in the third node to the fifth node via mac-layer forwarding. When the first node returns home to the network comprising the third fifth and sixth nodes, the first node can issue a first message 1065 with a routing identifier 1067 equal to its mac_address which due to the broadcast nature of such natures is received by the third, fifth and sixth nodes, which causes the fifth node to stop refreshing its mac_address in the binding table for the first packet flow. This new mac-layer CoA supercedes that previously issued by the fifth node and therefore the first packet flow will be directed to the first node.

In accordance with the present invention, addressed assigned to various nodes may be located in the same or different addressing domains. In some embodiments the addresses assigned to the first, third and fifth nodes are in a first addressing domain. In such a case the home address of the MN 1001 is from the same address prefix as the address of the third node and is shared with the fifth node. A fifth address associated with either the fifth or sixth nodes is often in a second addressing domain (e.g., the CoA address of the MNPS 1009 is normally from the same address prefix as the address of the access router). The second node and a second address corresponding to the second node can be in yet another addressing domain, e.g., in a third addressing domain. This may be due to the movement of the MN 1001 onto a foreign subnet and the second address being the CoA of the MN 1001. In various embodiments the first, second and third addressing domains include correspond to at least two different addressing domains. In other cases, the first, second and third addresses are in three different addressing domains. In still yet other embodiments, the first, the second and the third addresses are all in the same addressing domain. Thus, the present invention allows for a wide range of possibilities in regard to which addresses, and thus which nodes, are in the same or different addressing domains. Addressing domains are different if the addresses used within the domains have different address prefixes of the same prefix length, i.e. the set of N most significant address bits are different. Thus, addresses having the same prefix of length N, are determined to be in the same domain where N indicate prefix length and thus the number of bits used to distinguish between different domains. In various embodiments at least one of the first, second and third addressing domains is different from another one of said first, second and third addressing domains with addresses corresponding to different domains including different address prefixes. In one of such various embodiments said first and third addressing domains are the same and said second addressing domain is different from said first and second addressing domains. In another one of such various embodiments the second and third addressing domains are the same, and said first addressing domain is different from said first and second addressing domains. One or more addresses may be associated with each node, the associated address having the address prefix of the addressing domain in which the node is located.

Various features of the invention are designed to enable a first node to be pageable, whilst asleep or otherwise absent and unreachable by incoming packets intended for that first node, both by the arrival of packets at a second node which triggers network paging, but also by the generation of application events at an application agent module, which processes packets for the first node in its absence. This enables more sophisticated paging whereby the first node can go to sleep and inform the application agent to complete a task or detect an application event, and then page the first node when that task is completed or the event occurs. A page can then be generated when a file has been delivered or a Voice call arrives from a specific person, rather than by each packet that contributes to delivering the file or any incoming voice call. To enable fast paging and resultant connectivity, to for example respond to the call request immediately, the paging mechanism can deliver parameters to the first and third nodes and also install redirect forwarding for the first node rather than relying on a routing message from the first node after paging has completed. This enables paging and routing update, as well as address and mobility agent dynamic allocation to proceed in parallel.

Figure 11:
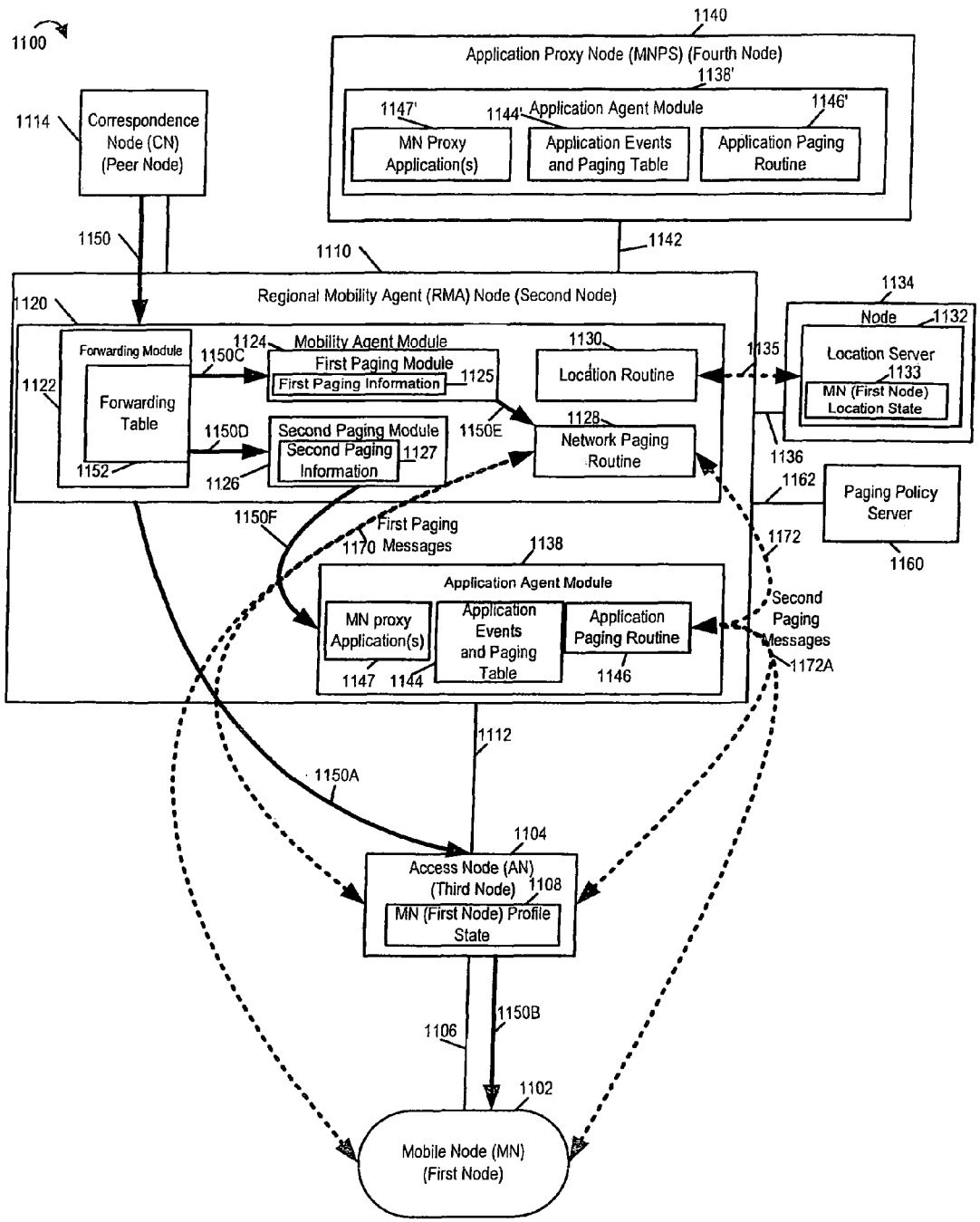
FIGS. 11-12 illustrate an exemplary system and signalling used in various embodiments of the present invention where paging is supported in a system where a mobile node proxy can be used to perform application processing for a mobile node.
Figure 12:
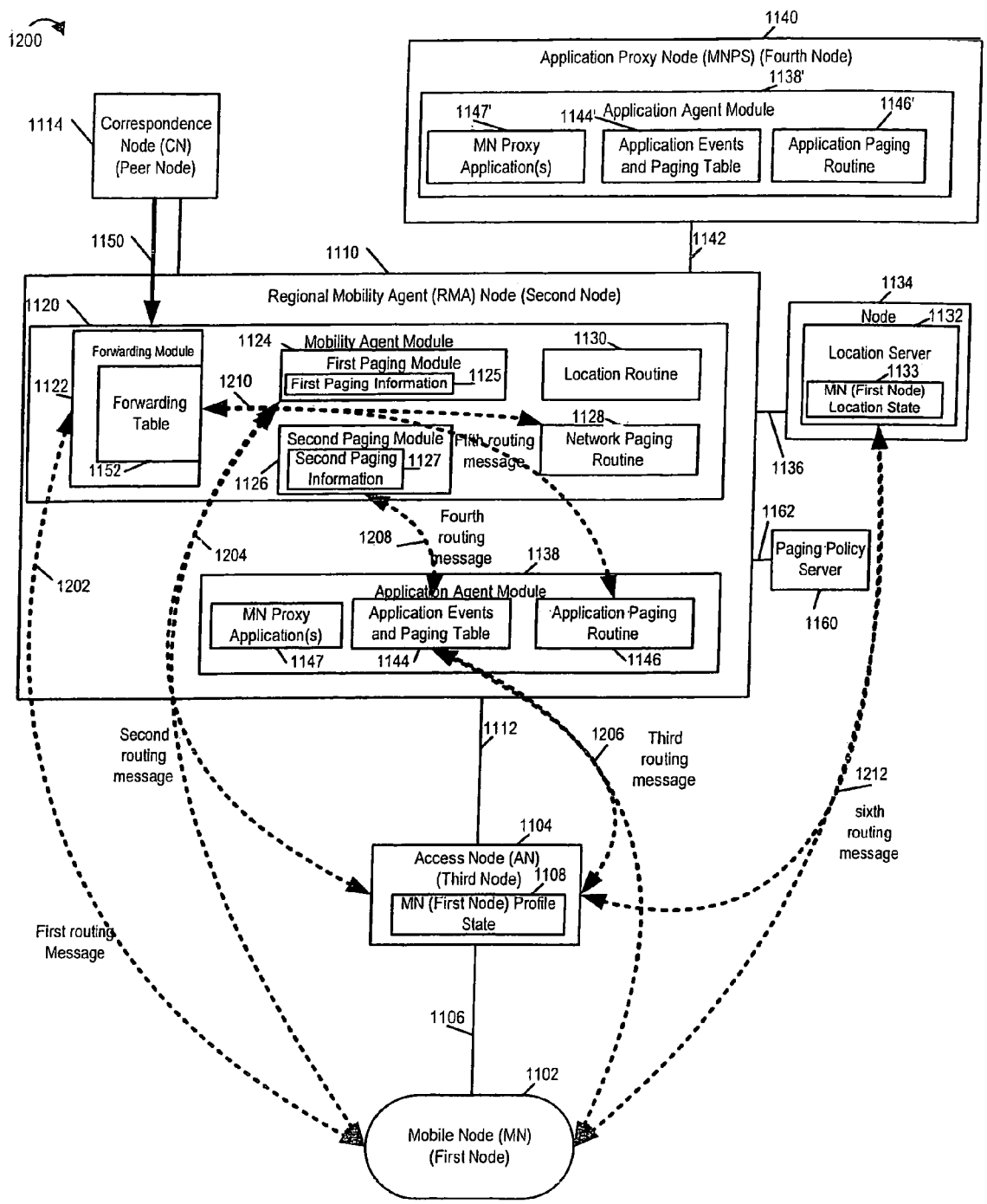

FIG. 11 shows drawing 1000 illustrating exemplary nodes, packets flows, and paging signalling in an exemplary system in accordance with the present invention. While FIGS. 11 and 12 show communications CN 114 to the MN 1102 it is to be understood that packets and message may travel from the MN to the CN 1114 as well. From the FIG. 11 shows a first node, e.g., an end node such as a mobile node (MN) 1102, that is coupled via wireless link 1106 to a third node, e.g., an access node (AN) 1104, said access node 1104 including profile state 1108 associated with MN 1102 (first node) that controls what communications sessions normally performed by MN 1102 can be performed by an application agent module 1138 or 1138'. Application agent module 1138 may be located at a second node, e.g., a regional mobility agent (RMA) node 1110. Application agent module 1138' may be located at a fourth node, e.g., an application proxy node, a mobile node proxy server (MNPS) 1140. The RMA node 1110 is coupled to AN 1104 via network link 1112. A peer node, e.g., a correspondence node (CN) 1114 is coupled to the RMA node 1110. CN 1114 may be another MN communicating with MN 1102 in a communications session. FIG. 11 also includes a paging policy server 1160 coupled to RMA node 1110 via link 1162. The paging policy server 1160 may send information indicating a paging trigger event to the application agent module 1138, 1138'. RMA node 1110 includes a mobility agent module 1120 which itself includes a forwarding module 1122 including a forwarding table 1152, a first paging module 1124 including first paging information 1125, a second paging module 1126 including second paging information 1127, a network paging routine 1128 and a location routine 1130. Packet flows in FIG. 11 are shown as heavy solid line arrows whilst signalling is shown as heavy dashed line arrows. The forwarding module 1122 directs packets 1150 received from the peer node, CN 1114, that are addressed to MN 1102, towards either MN 1102 (via AN 1104) as packets 1150A, or towards the first and second paging modules 1124, 1126, as packets 1150C, 1 150D, respectively. Packets 1150C, 1150D that are sent to the first and second paging modules 1124, 1126 will be compared against first paging information 1125, second paging information 1127 (matched to or classified by the paging state), respectively, to determine subsequent packet processing.

If the packet(s) 1150C match against the first paging information 1125 then the packet(s) 1150E will trigger the network paging routine 1128 to send a first paging message 1170 to the current location of the MN 1102. In the example of FIG. 11 this current location is such that MN 1102 is coupled to AN 1104. Alternatively MN 1102 could have been currently located differently, such that MN 1102 was coupled to any similar access node in the system. The first paging message 1170 can be sent direct to the address of the MN 1102 or to an address of AN 1104, and in either case the first paging message 1170 includes instructions for paging MN 1102 given the type of packets that triggered the page as identified by the matching entry in the first paging information 1125. The location of MN 1102 is determined by the networking paging routine 1128 by querying, directly or indirectly, a location server 1132 which may be in the RMA node 1110, or in another node 1134 coupled to RMA node 1110 via link 1136 as shown in FIG. 11. Location routine 1130, responding to a network paging routine 1128 query may exchange signalling 1135 with location server 1132 to obtain MN 1102 (first node) location state information 1133. The network paging routine 1128 can employ various techniques to contact MN 1102 via its current location, and to cause MN 1102 to become reachable due to the availability of packets for MN 1102. The first paging module 1124 ensures that an attempt to contact MN 1102 is performed when sufficiently important packets arrive at RMA node 1110 for MN 1102. The first paging message 1170 can include information of the entry in the first paging information 1125 (and hence the nature of the received packets, that triggered the page to MN 1102. The first paging message 1170 information can also include the delivery of an MN (first node) profile state 1108 to the AN 1104, so that the AN 1104 can contact the MN 1102 (identifiers, IP addresses, paging slots, security associations) and can then police the activity of MN 1102 in terms of its communications. The first paging message 1170 information can also include dynamically allocated addresses and mobility agent state whose allocation was triggered by the paging trigger via the first paging information 1125. Alternatively, the first paging message 1170 can include information (such as policy server address and MN 1102 identifier) to enable MN 1102 and AN 1104 to obtain the profile state 1108 and to dynamically allocate parameters. The first paging message 1170 is replied to by either MN 1102 or AN 1104 on behalf of MN 1102 so that the network paging routine 1128 determines the result of the paging message. One such result is that MN 1102 becomes reachable such that packets addressed to MN 1102, including those that were initially routed via the first paging module 1124, are now forwarded by the forwarding module 1122 using the forwarding table 1152 to MN 1102 via AN 1104 in packets 1150A, 1150B. The change in the forwarding table 1152 can be made in a number of ways as described later.

If the packet(s) 1150D match against the second paging information 1127 then the packet(s) 1150D are forwarded as packets 1150F to the application agent module 1138 or 1138' which may be in the RMA node 1110, or in a fourth node, e.g., an application proxy node, mobile node proxy server (MNPS) 1140, coupled to the RMA node 1110 via link 1142 as shown in FIG. 11. Specifically, the RMA node 1110 can include entries in the second paging information 1127 that directs packets 1150D to a multitude of local and remote application agent modules 1138, 1138'. The application agent module 1138, 1138' includes a table of application events and associated paging actions 1144, 1144', along with an application paging routine 1146, 1146', and MN proxy application(s) 1147, 1147'. The application agent module 1138, 1138' can process the payload of the received packets 1150F that match the second paging information 1127, under the control of the MN proxy application(s) 1147, 1147', on behalf of the MN 1102, said payload including application data, said processing generating application data and additional outgoing packets directed back to the peer node, CN 1114, towards the MN 1102 or towards alternative peer nodes. MN proxy application(s) 1147, 1147' may include, e.g., communications applications, data processing applications, file downloading communications applications, spreadsheet applications, and decoder applications. The processing of said packets, packet payloads and application data generates application events that are compared to the table 1144, 1144' of such events that are associated with the MN 1102. When these application events occur, such as the download of a complete file or indication of the availability of a new mail message for the MN 1102, then the associated application paging event is triggered. One such paging event is to send a second paging message 1172 to the network paging routine 1128 to trigger the first paging message 1170 so that network reachability with MN 1102 can be reestablished in the forwarding table 1152. Alternatively, the application paging routine 1146, 1146' can send the second paging message 1172A directly to the current location of the MN 1102 as indicated by the location information 1133, said second paging message 1172A being different from the first paging message 1170 in that the application event and associated application state can be delivered in the paging message 1172A to the AN 1104 and/or the MN 1102. This gives MN 1102 more precise information as to why it is being paged, and whether or not it should wake-up, and the MN 1102 can then respond to the page with further directions for the application agent 1138, 1138' and return to sleep. The second paging message 1172A can however also include the MN profile state 1108 (or trigger it to be fetched by the AN 1104) and dynamically allocated parameters as was described for the first paging message 1170 information.

FIG. 12, drawing 1200, illustrates the signaling that is undertaken either in preparation for, or in response to network or application layer paging. FIG. 12 includes the same or similar nodes MN 1102 (first node), AN 1104 (second node), RMA node 1110 (third node), MNPS 1140, location server node 1134, and CN 1114, as included and previously described in FIG. 11. A first routing message 1202 is triggered by the receipt of a page at MN 1102 and could typically be a MIP Registration Request or Binding update which installs the CoA of the MN 1102 into the mobility agent module 1120 so that packets are redirected towards MN 1102 and away from the paging modules 1124, 1126. A second routing information message 1204 is sent from either the MN 1102 or AN 1104 and installs entries into the first paging information 1125 when MN 1102 is going to sleep, so detailing when MN 1102 can be paged given arriving packets. The response message provides the result of the installation. The first paging information 1125 can specifically be included in the MN profile state 1108 such that the second routing message 1204 moves MN 1102 profile state 1108 into the first paging information 1125 and the first or second paging message 1170, 1172(A) returns it to the AN 1104 when a page is triggered. A third routing message 1206 is sent from the MN 1102 or AN 1104 to the application events and paging table 1144, 1144' to define which events and associated paging processing should be processed. The application agent module 1138, 1138' then installs the second paging information 1127 into the mobility agent module 1120 using a fourth routing message 1208 so that the right types of packets are forwarded to the application agent module 1138, 1138' for processing. The mobility module 1120 replies to the application agent module 1138, 1138' and the application agent module 1138, 1138' replies back to the MN 1102 or AN 1104 that initiated the third routing message 1206. A fifth routing message 1210 is used by either the network paging routing 1128 or the application paging routine 1146, 1146' to update the forwarding table 1152 to redirect packets to/from MN 1102, and hence from/to the first and second paging module 1124, 1126. The fifth message 1210 can for instance be triggered by either paging routine 1128 when the request for a paging sequence is received at that paging routine 1128 but in advance of sending first and/or second paging messages 1170, 1172(A). Alternatively, the fifth routing message 1210 can be triggered on receipt of the paging response from AN 1104 or MN 1102 following the sending of the first and/or second paging messages 1170, 1172(A). Finally, the fifth routine message 1210 can be triggered by the receipt of second, third, or fourth routing messages 1204, 1206, or 1208, respectively, at the mobility agent module 1120 or the application agent module 1138, 1138'.

A sixth routing message 1212 is a location update message that is sent from the MN 1102 or AN 1104 to the location server 1132 to update the location state 1133 of the MN 1102, in terms of IP address or other identifier of the AN 1104 that is unique at each of the access nodes in the system. This enables the paging messages to be sent to the AN 1104 when the MN 1102 is either unaddressed or unreachable. Paging messages can also be sent direct to the address of the MN 1102 but forwarded via (i.e., tunnelled to) the AN 1104 due to the absence of a route in the RMA node 1110 (which is instead directing packets to the first and second paging modules 1124, 1126. The location information 1133 can include application identifiers such as SIP URIs so that application routing rather than IP routing can be used to reach the AN 1104 and then the MN 1102.

The sixth routing message 1212 can also be generated by the first, fourth and fifth routing messages 1202, 1208 and 1210 (not shown for simplicity) to update the location of the MN 1102 indirectly as the MN 1102 or AN 1104 sends routing signals on behalf of the MN 1102, which reveals location changes.

Exemplary processing performed in accordance with the method of the present invention will now be described with regard to one particular exemplary embodiment and the corresponding flow of processing steps shown in FIGS. 14-17 which, in combination, show the steps of an exemplary method 1700. As will be appreciated numerous variations on the order of the steps and/or which nodes perform particular steps are possible with the exemplary flow chart showing one potential implementation.

The method 1400 starts with 1402 which is followed by initialization step 1404. In initialization step 1404 various network elements, e.g., the mobile node, application proxy module, mobility agent module, etc. are initialized. Operation proceeds from step 1404 to steps 1406 and 1410 which may be performed in parallel. In step 1406, the mobile node, access node serving as the mobile node's point of network attachment and/or a paging policy sever are operated to communicate first paging trigger event information to the mobility agent and, in some cases, to also communicate second paging trigger event information to the application agent. First paging trigger event information may include, e.g., packet header information and/or other information used to make a decision on whether or not to page the mobile node based on the content of a received packet. Such network paging information generally does not involve the payload of a packet but in some cases may. Second paging information, in contrast to first paging information, is application event paging information. This information indicates one or more application events, e.g., application processing results, which should trigger a paging operation. Application events used to trigger paging operations are frequently the results of processing the payload of multiple packets including application information or data. Examples of application events include successful downloading of a complete file corresponding to a particular communication application, e.g., Web Browser, decoding of data corresponding to a downloaded file, and/or completion of some computation or computations corresponding to an application. Examples of completing computations which may trigger an application paging event include completing of computations corresponding to a spread sheet using data received in multiple packets, completing of scientific computation using data received in multiple packets. The use of such application trigger events are particularly beneficial in cases where a mobile node does not want to be paged until some degree of processing has been completed on its behalf, e.g., application processing has proceed at the proxy application server to a point where the mobile node desires to resume direct control of application processing.

Operation proceeds from step 1406 to step 1408 wherein the application agent, e.g., the MN application proxy, is operated to receive and store paging trigger event information, e.g., the information communicated in step 1406. Operation is seen proceeding from step 1408 to step 1406 to illustrate that paging trigger information may be transmitted at different points in time, e.g., as required to implement desired application proxy and paging operation.

In step 1410, the mobile node is operated to execute one or more applications, e.g., a communications application for communicating with a peer node and one or more applications for processing packet contents, e.g., payload, received from the peer node. The executed applications may include, e.g., a file download application, a decoder application used to decode received data, a spreadsheet application and/or another application which performs computations using information and/or data received from a peer node in one or more packets.

As part of the process of executing one or more applications in step 1410, the mobile node may start to initiate a file or other data download from a peer node. Step 1412 represents such an exemplary operation. In step 1412 the mobile node communications application initiates a file download from the peer node and the processing of the downloaded file information, e.g., information, data or portions of the downloaded file communicated from the peer node to the mobile node in packets.

In step 1414, the mobile node and/or the access node serving as the mobile node's point of network attachment signals the application proxy that it should take over application processing for the mobile node. Such signalling may be initiated by the mobile node, e.g., before entering a sleep state, or by the access node in response to detecting the mobile node's unavailability to continue interacting with the peer node. As part of the signalling to the application proxy, information about the state at which the mobile node stopped application processing and/or one or more application events which are to trigger a resumption of processing are communicated to the application proxy. In addition, using a security association between the mobile node and application proxy, a shared secret, security association information used to secure communication between the peer node and the mobile node may be communicated to the application proxy. This security communication may be another shared secret used to encrypt/decrypt information communicated between the mobile node and peer node. The peer node need not, and is not, informed of the transfer to the security association information to the application proxy in some embodiments of the present invention making the processing handoff to the application proxy transparent to the peer node in such cases even when an end to end security association exists between the peer node and mobile node.

From step 1416, operation proceeds to step 1422. In step 1422, the mobile node or the access node serving as the mobile node's point of network attachment send packet filtering and redirection information to the mobile node's mobility agent. This information is used to cause the mobility agent to redirect packets corresponding with a destination address corresponding to said mobile node, and the particular application(s) for which the application proxy has been given processing responsibility, to the application proxy. The information may cause some or all packets with a destination address corresponding to the mobile node to be redirected to the application proxy. However, redirection of packets corresponding to a selected application or a few selected applications is possible. In such cases, different packet flows directed to said mobile node may be treated differently with some being redirected to the mobile node's application proxy and others being subject to other processing, e.g., filtering based on packet content to determine if the MN should be paged.

In step 1424, the mobile node is operated to enter a sleep state. This is exemplary of mobile node operation after transferring application processing responsibility to the mobile node application proxy. While in the sleep state, as shown in step 1426, the mobile node periodically monitors for paging messages. Such receipt of a paging message may cause the mobile node to transition to a more active state, e.g., an on-state, and to resume application processing and interaction with the peer node. Operation proceeds from step 1426 to step 1432 via connecting node 1430.

In step 1432 the mobility agent is operated to receive packets including a destination address corresponding to said mobile node. This is part of the normal process of communicating packets between the peer node and the mobile node. Normally the mobility agent directs such packets to the mobile node. However, in accordance with the invention, packets may be redirected by the mobility agent to the mobile node application proxy. In step 1434, the mobility agent is operated to compare information in the received packets having a destination address corresponding to the mobile node, to first and second packet type information used to classify the received packets into different flows, e.g., flows corresponding to different mobile node applications. In the case of received packets of the first type, operation processing proceeds from step 1434 to step 1436. In step 1436, the mobility agent compares at least a portion of the content of a received packet to first paging trigger information to determine if the mobile node should be paged. Assuming the packet contents matches a paging trigger, in step 1438 the mobility agent pages, e.g., transmits a paging message to the mobile node, in response to detecting that the contents of a received packet matches a paging trigger. Paging trigger information may be updated to reflect the state of the mobile node. For example, receipt of some packets may trigger paging if the mobile is in a sleep state while they might simply be forwarded when the mobile is in an active state. In step 1440, the packets of the first type are forwarded to the mobile node. The mobile node is operated in step 1442 to receive and process packets of the first type after receiving the page. Operation is shown proceeding from step 1442 to step 1436 to show that processing does not halt with step 1442 and is preformed on an ongoing basis as packets of the first type are detected.

If packets of the second type are detected in step 1434 operation proceeds to step 1444 instead of step 1436. Packets of multiple types, corresponding to different flows, may be processed in parallel. In step 1444, the mobility agent redirects packet of the second type to the mobile node's application proxy instead of to the mobile node. Then, in step 1448 the application proxy receives the redirected packets for processing. Next, in step 1450, the application proxy is operated to perform application processing using the payload content of multiple received redirected packets. The application processing results in application events, e.g., completion of a file download, completion of computations for a particular application which are based on data/values received in multiple packets, and/or decoding of a downloaded file. Applications which perform such processing may be implemented in conjunction with a communications application which is responsible for overseeing communication with the peer node which, based on information from the mobile node application proxy, will remain under the impression that it is continuing to interact with the mobile node. Exemplary applications executed by the mobile node application proxy include spread sheet application and file decoding applications as well as various other applications which are normally executed by the mobile node.

Operation proceeds from step 1450 to step 1454 via connecting node 1452. In step 1454, the application proxy compares one or more application events resulting from application processing performed in step 1450 to stored paging event trigger information. Operation proceeds from step 1454 in those cases where a match to a trigger event is detected. While in step 1454 the compared application results are normally the result of processing the payload of multiple packets, in some cases the application result is the result of the information in one packet subject to application processing using some information from the mobile node, e.g., state information indicating the status of the mobile node, a previous mobile node application result or some other information communicated from the mobile node. Thus, a single packet in combination with some information from the mobile node may trigger paging of the mobile node.

With the detection that a paging event trigger has been satisfied, in step 1456 the application proxy initiates a paging operation. This may be done, e.g., by sending a paging message to the mobile node's mobility agent which will trigger a paging operation. In some cases, the paging message includes a packet of the first type with information included therein which will cause the mobile node to be paged. The transmission of a paging message used to trigger paging of the mobile node is shown in sub-step 1457.

Operation proceeds from step 1456 to steps 1458 and 1462. In step 1458, the mobility agent is operated to page the mobile node in response to receiving the paging message from the application proxy. Then in step 1460, the mobile node, assuming it is in a sleep state, is operated to transition from the sleep state to an active state in response to receiving the page message. Thus, by the time packet flow redirection ceases and the packets are again being directed to the mobile, the mobile will be in a sufficiently active state to receive the packets and continue application processing. Operation proceeds from step 1460 to step 1470.

In step 1462 the application proxy is operated to transmit application processing results and application sate information to the mobile node. This allows the mobile node to resume application processing from the point the application proxy stopped being responsible for the applicator processing. Then, in step 1464, the application proxy transmits a message to the mobility agent to cause the mobility agent to cease redirection of packets with a destination address corresponding to said mobile node to the application proxy. The message may, and often does, result in updating of the packet flow filtering information at the mobility agent to stop the redirection of packets of the second type to the application proxy. Operation proceeds from step 1464 to step 1468. In step 1468, the mobile node receives application state information from the application proxy before operation proceeds to step 1470.

In step 1470, the mobile node receives packets from the peer node and resumes application processing from the point the application proxy detected the application processing result which caused the mobile node to be paged. Operation regarding the exemplary mobile processing corresponding to the communications session with the peer node then stops in step 1472, e.g., in response to the particular communications session with the peer node being terminated or otherwise completed. Multiple processing handoffs between the mobile node and mobile node application proxy are possible during a single communications session even though a single handoff is shown in the exemplary flow of FIGS. 14-17.

Figure 13:
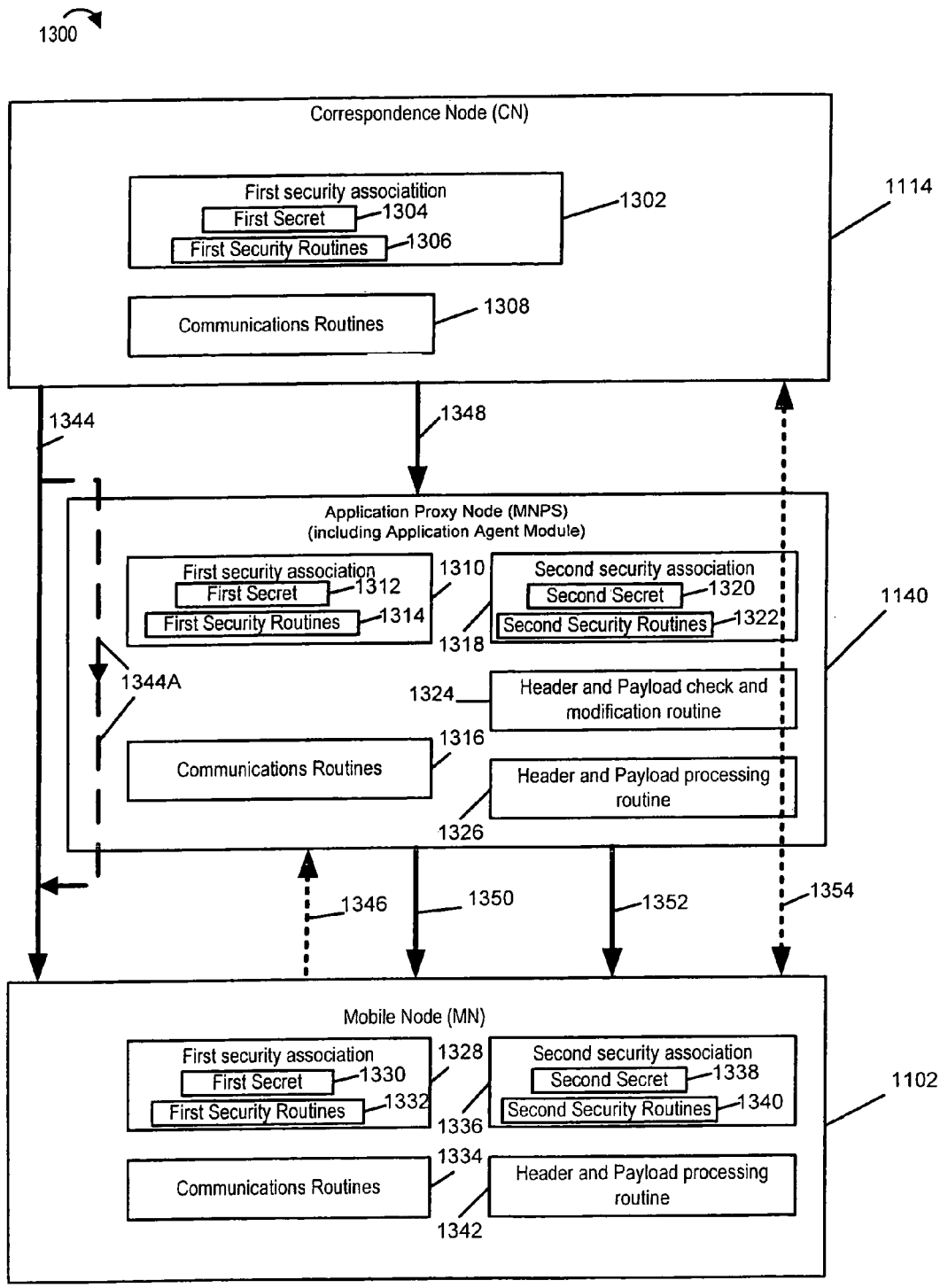
FIG. 13 illustrates an exemplary system and security related signalling used in various embodiments of the present invention which allow a peer node to maintain an end to end security association throughout a communications session even in the case of application processing handoffs between a mobile node and an application proxy.
Figure 14:
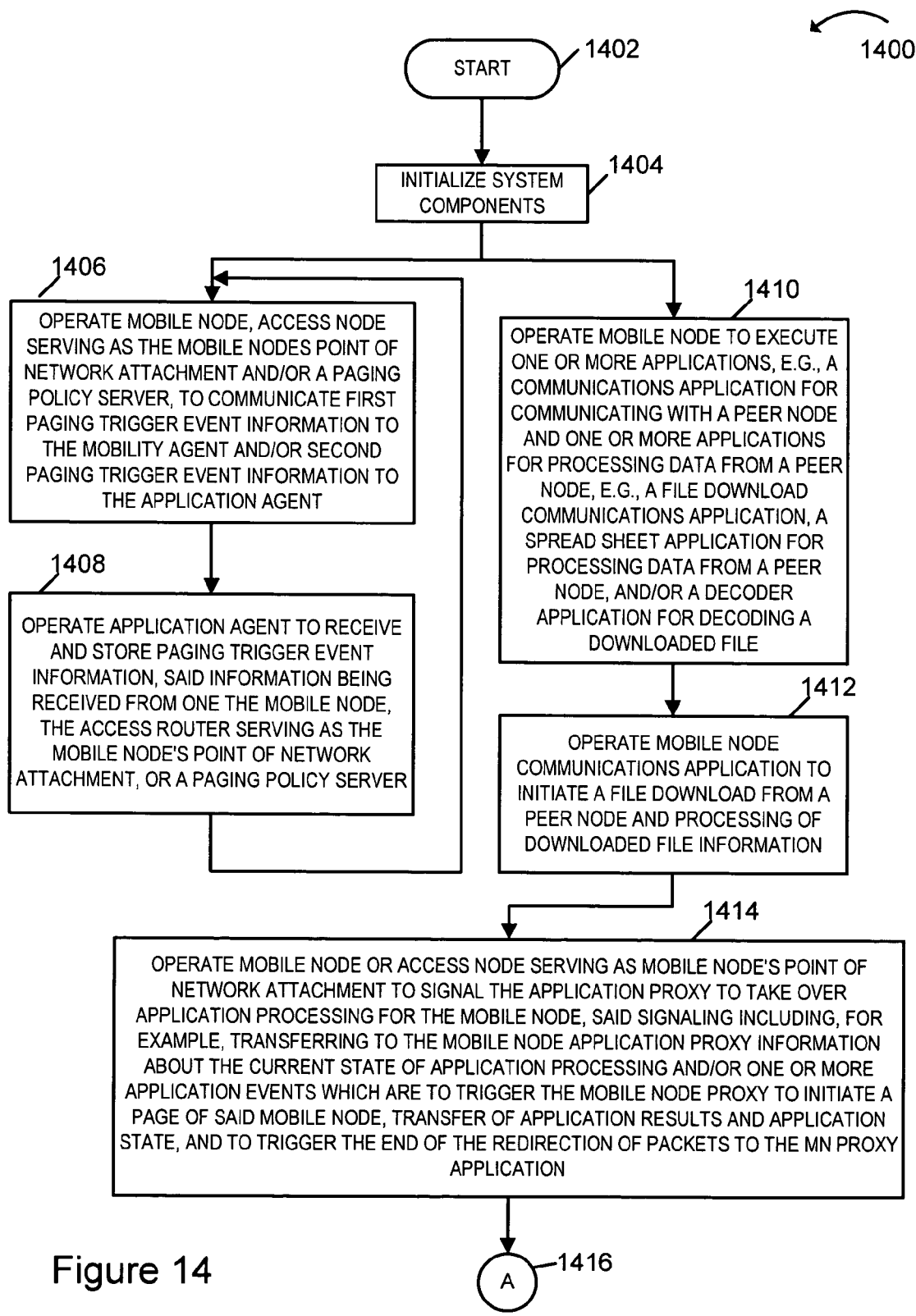
FIGS. 14-17 illustrate processing performed in accordance with the paging and application processing handoff features of the present invention in one particular exemplary embodiment.
Figure 15:
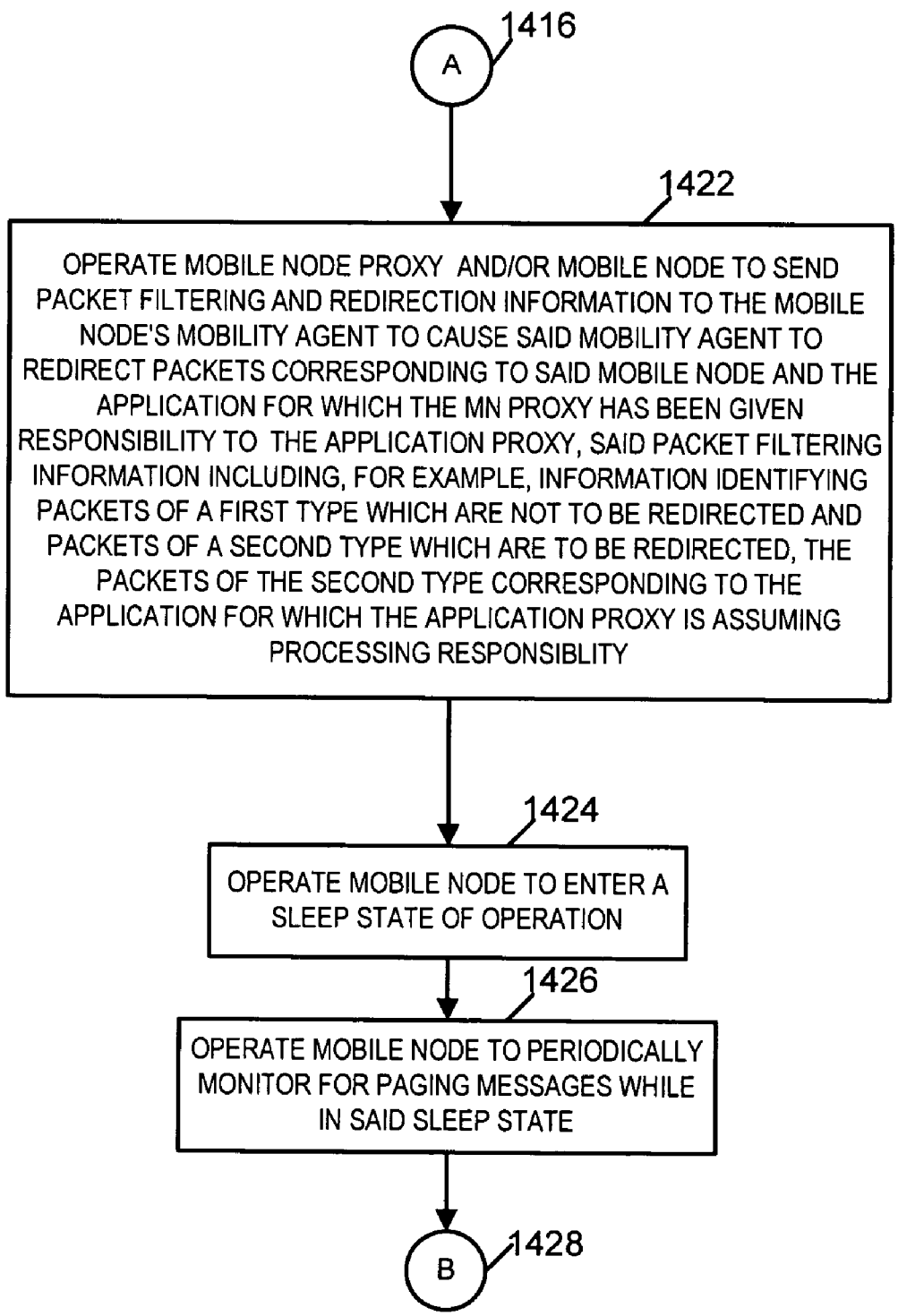
Figure 16:
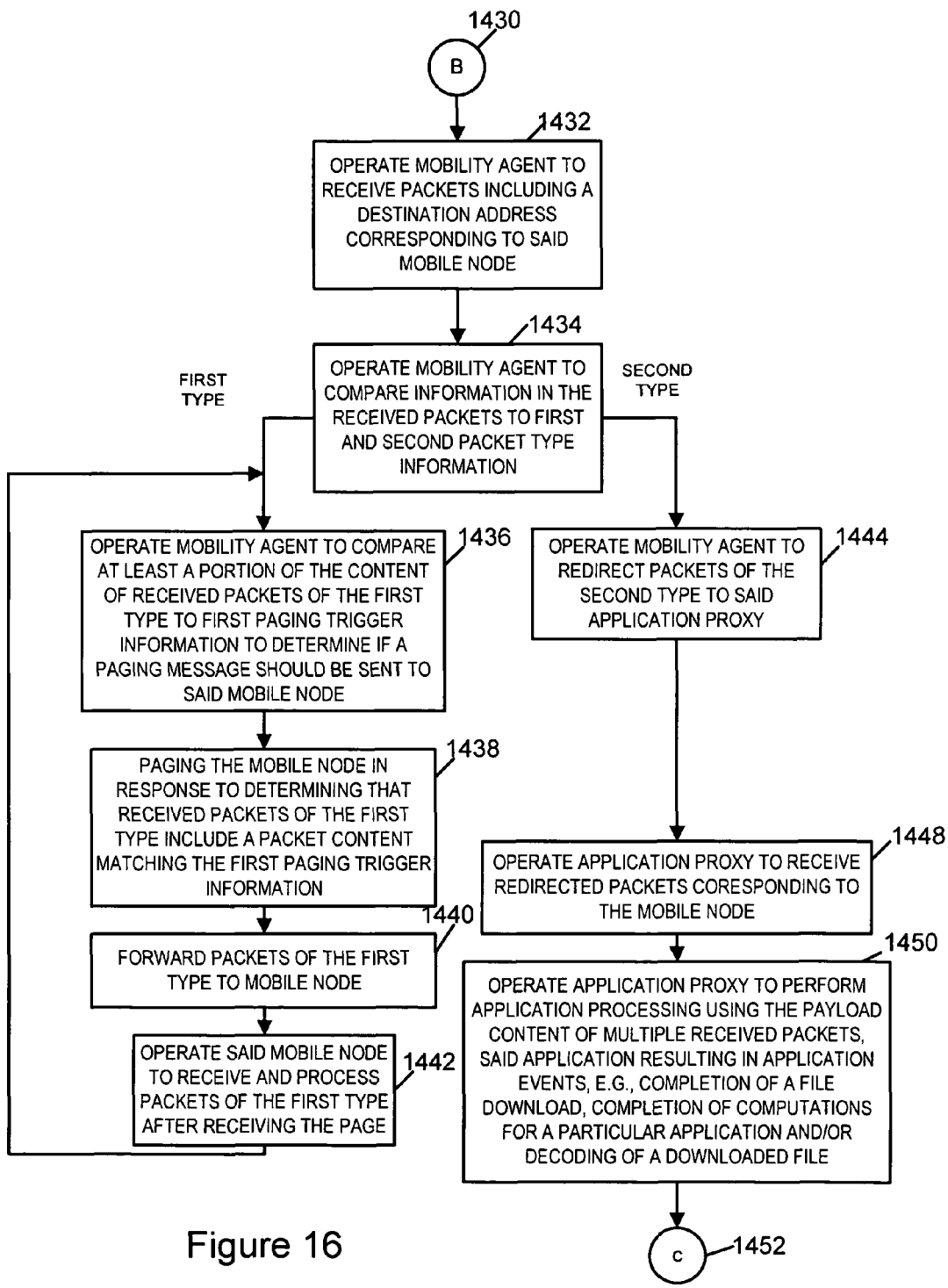
Figure 17:
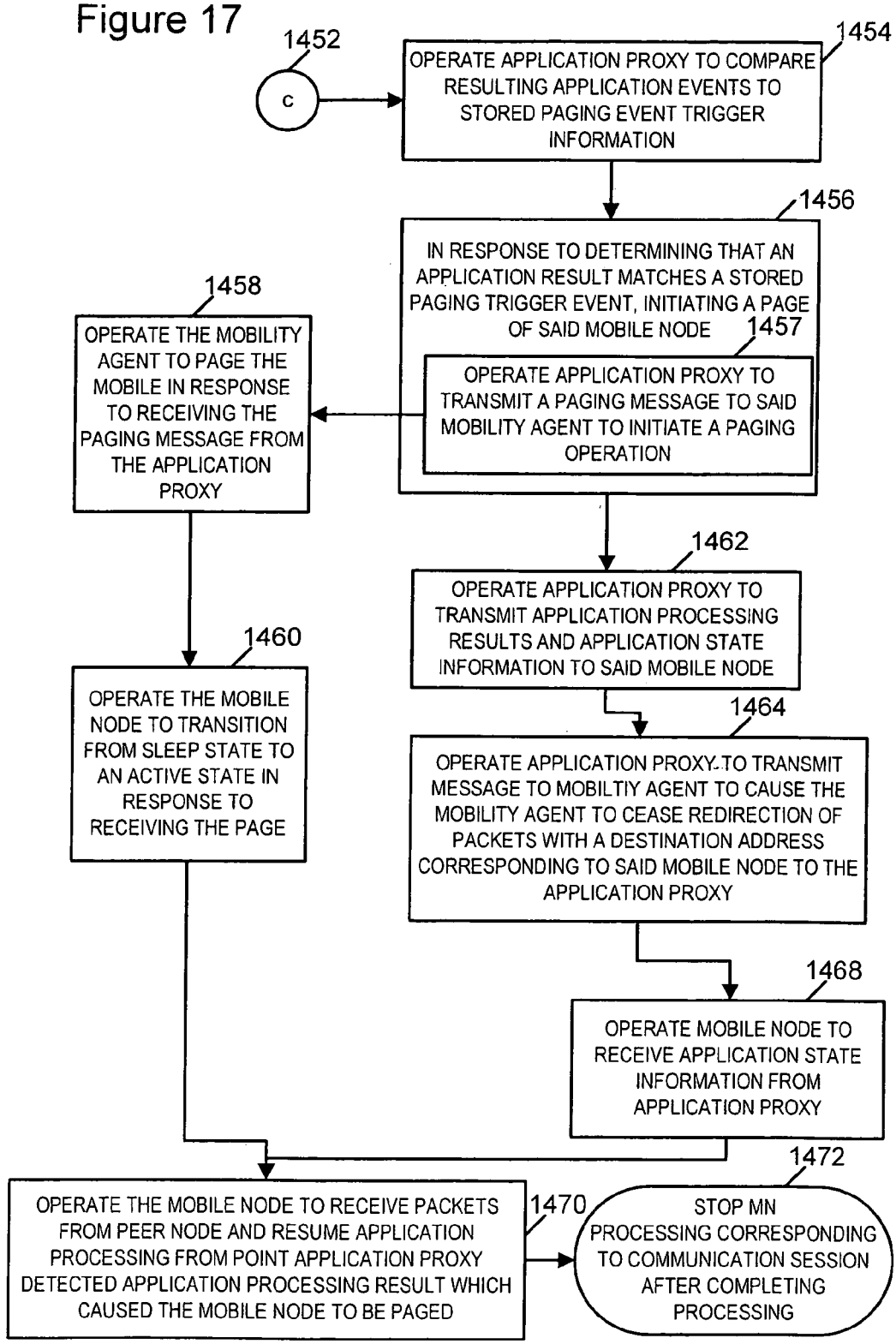

Various security features of the invention will now be discussed. Drawing 1300 of FIG. 13 shows correspondence node CN 1114, mobile node MN 1102, and MNPS (including application agent module) 1140. CN 1114 includes a first security association 1302 including a first secret 1304 and first security routines 1306 and communications routines 1308. MN 1102 includes a first security association 1328 including a first secret 1330 and first security routines 1332, communications routines 1334, a second security association 1336 including a second secret 1338 and second security routines 1340, and a header and payload processing routine 1342. MNPS 1140 includes a first security association 1310 including a first secret 1312 and first security routines 1314, communications routines 1316, a second security association 1318 including a second secret 1320 and second security routines 1322, a header and payload check and modification routine 1324, and a header and payload processing routine 1326. In accordance with one feature of the invention, a shared first secret 1304, 1330 exists between CN 1114 and MN 1102, and is securely transferred using a second security association 1336,1318 by the MN 1102 to the MNPS 1140, to enable MNPS 1140 to undertake security processes and packet processing on behalf of the MN 1102. The security routines 1306, 1332 may be the same encryption/decryption routines used by the CN 1114 and can be used to encode and decode information communicated between the CN 1114 and the MN 1102.

Three possible configurations will now be described. The first configuration is when the MN 1102 is receiving packets from the CN 1114 via the MNPS 1140, and the MNPS 1140 is then able to securely inspect and modify the packet header and / or the payload via header and payload check and modification routine 1324 before forwarding the packets to the MN 1102. This creates an authorized 'man-in-the-middle' in that the MNPS 1140 that securely receives the shared first secret 1330, from the MN 1102 can act as such a man in the middle. Shared first secret 1330 received from MN 1102 in stored in first secret 1312 in MNPS 1140. This can be achieved whether the shared first secret 1330 is used to authenticate, integrity protect and/or encrypt the packet. The same processing can be achieved for packets from the MN 1102 to the CN 1114, and the CN 1114 is normally unaware of the presence of the MNPS 1140, said MNPS 1140 being a support node for the MN 1102. The processing by the MNPS 1140 can be used to discard fraudulent packets claiming to be to/from the MN 1102, to read and even adjust parameters communicated to the MNPS 1140 by the MN 1102 for operator control of service features such as SIP signalling and resource reservation.

In the second configuration, the MN 1102 can communicate its shared first secret 1330 to the MNPS 1140 so that the MNPS 1140 can securely participate in communications sessions with the CN 1114, as a proxy for the MN 1102, such that the MN 1102 can then for example go into sleep or otherwise leave the communications system temporarily. Once again, the CN 1114 is unaware of the absence of the MN 1102 because the MNPS 1140 acts on its behalf with the same communications parameters used with the MN 1102 (such as IP address and security processes).

In a hybrid mode, the MNPS 1140 can act as either a man-in-the middle or a proxy on a per packet flow basis, and can switch between man in the middle and proxy modes in time, under the control of the MN 1102 so that processing by the MNPS 1140 can cause a transition to man in the middle and visa versa. Also note that in proxy mode, packets resulting from proxy processing at the MNPS 1140 can be subsequently transferred to the MN 1102 using either the first shared secret 1330 with the CN 1114 (first secret 1304) and MPS 1140 (first secret 1312), or the second security association 1318 (which may or may not use a second shared secret 1320) between the MN 1102 and MNPS 1140 that was used to securely transfer the first shared secret 1330 from the MN 1102 to the MNPS 1140.

The flows are shown in FIG. 13 for the case of the second security association 1318/1336 using a second shared secret 1320/1338. CN 1114 is coupled to MNPS 1140 in support of packet flow 1348. MNPS 1140 is coupled to MN 1102 in support of packet flow 1350. CN 1114 is also coupled to MN 1102 in support of packet flow 1344. CN 1114 has a first security association 1302 with first shared secret 1304 and first security routines 1306 which apply the first shared secret 1304 to packets 1348 and 1344 to secure them as directed by the first security association 1302. MN 1102 also includes matching first security association 1328, first secret 1330 and first security routines 1332 to check security information on packets 1344 and packets 1350 to facilitate authentication, integrity checks and decryption as directed by the first security association 1328. CN 1114, MN 1102, and MNPS 1140 also include communications routines 1308, 1334 and 1316 respectively which facilitate the generation and reception of packet flows 1344, 1348 and 1350.

MN 1102 and MNPS 1140 also include second security associations (1336, 1318), second secrets (1338, 1320) and second security routines (1340, 1322), respectively, which enables the MN 1102 to securely transmit its first security association secret 1330 to the MNPS 1140 using signaling message 1346, where it is retained in first secret 1312. When the MNPS 1140 has the first security association state, containing the first secret 1312 and first security routines 1314, then, provided packets between the CN 1114 and the MN 1102 are routed through the MNPS 1140, as in flow 1344A, then the MNPS 1140 can intercept the packets 1344A and use the header and payload check and modification routine 1324 to examine the packets in the flow and make adjustments. The packets can then be discarded (faulty packets that fail security) or forwarded (checked and sometimes adjusted packets) to the destination address of the packet which is the MN 1102 or the CN 1114. Note that the header and payload check and modification routine 1324 can leave the packet unaltered whilst extracting information from the header or payload of use to processes in the MNPS 1140 such as network address translation, admission control or accounting and policy processes etc. In an alternative embodiment, the packets are addressed to the MNPS 1140, acting as the proxy for the MN 1102 as in flow 1348, and the MNPS 1140 then forwards the checked and modified packets 1350 to the MN 1102 using the first or second security associations 1310, 1318, respectively, to secure the packets. Note that flow 1350 can occur at a significant period of time after the packet flow 1348 was received at the MNPS 1140.

The MN 1102 and MNPS 1140 also include a header and payload processing routine 1342, 1326, respectively, which represents the packet reception and subsequent payload processing that an endpoint of a communications flow would undertake, including application state generation. The header and payload processing 1326 in the MNPS 1140 enables the MNPS 1140 to act as a proxy and issue flow 1350 from incoming flow 1348 which is identical to flow 1350 except for the source and destination addresses, and the period during which they are transmitted. In contrast flow 1352 is a flow derived from and triggered by flow 1348 and is different from flow 1350 in additional ways such as number, size and payload contents of packets reflecting application processing of packet flow 1348. Once again flow 1352 can be secured either using first or second security associations 1310, 1318, respectively, and can be sent as flow 1348 is received at the MNPS 1140 or some time later. The header and payload processing routine 1342 in the MN 1102 can then receive flows 1344, 1350 and 1352, understand from the source and destination addresses of the packets and the security header information, which security association to apply and who originated the packets, before obtaining the resulting application data from the packet flow securely.

It has already been explained how the first security association 1328 (first secret 1330) in MN 1102 can be obtained by the MNPS 1140 via the second security association 1318/1336 and message 1346. Alternatively, the first security association 1310 (first secret 1312) can be deployed into the MNPS 1140 at the same time as it is deployed into the CN 1114, as first security association 1302 (first secret 1304), and in the MN 1102, as first security association 1328 (first secret 1330), during the security negotiation signalling phase that includes messages 1354 that visit the three nodes: CN 1114, MN 1102, MNPS 1140 and which can deposit the first security association (first secret) 1302 (1304), 1328 (1330), 1310 (1312), respectively into each of the nodes 1114, 1102, 1140 in a secure manner.

Figure 18:
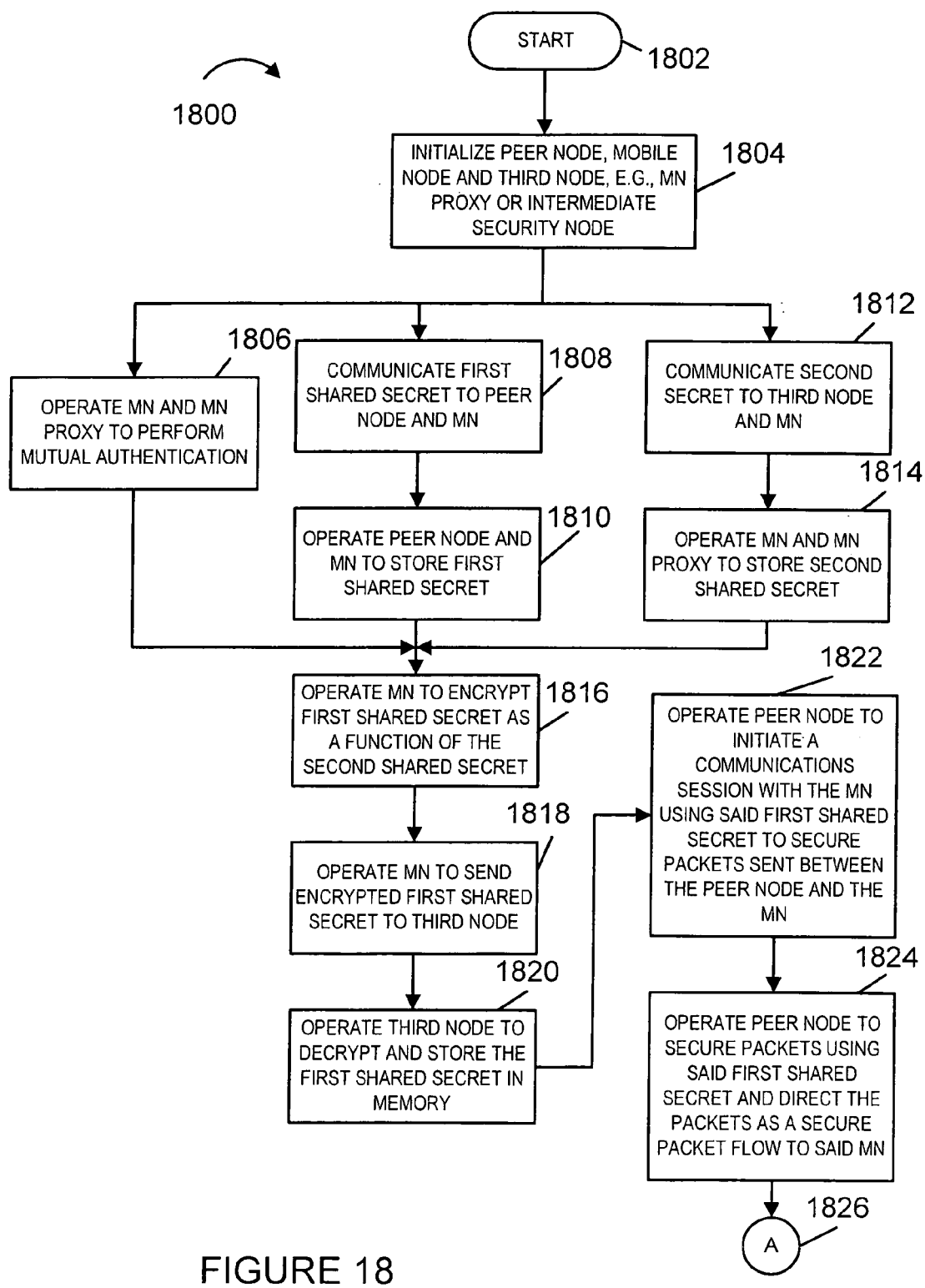
FIGS. 18-20 illustrate processing performed in accordance with three way security features of the present invention in one particular exemplary embodiment.
Figure 19:
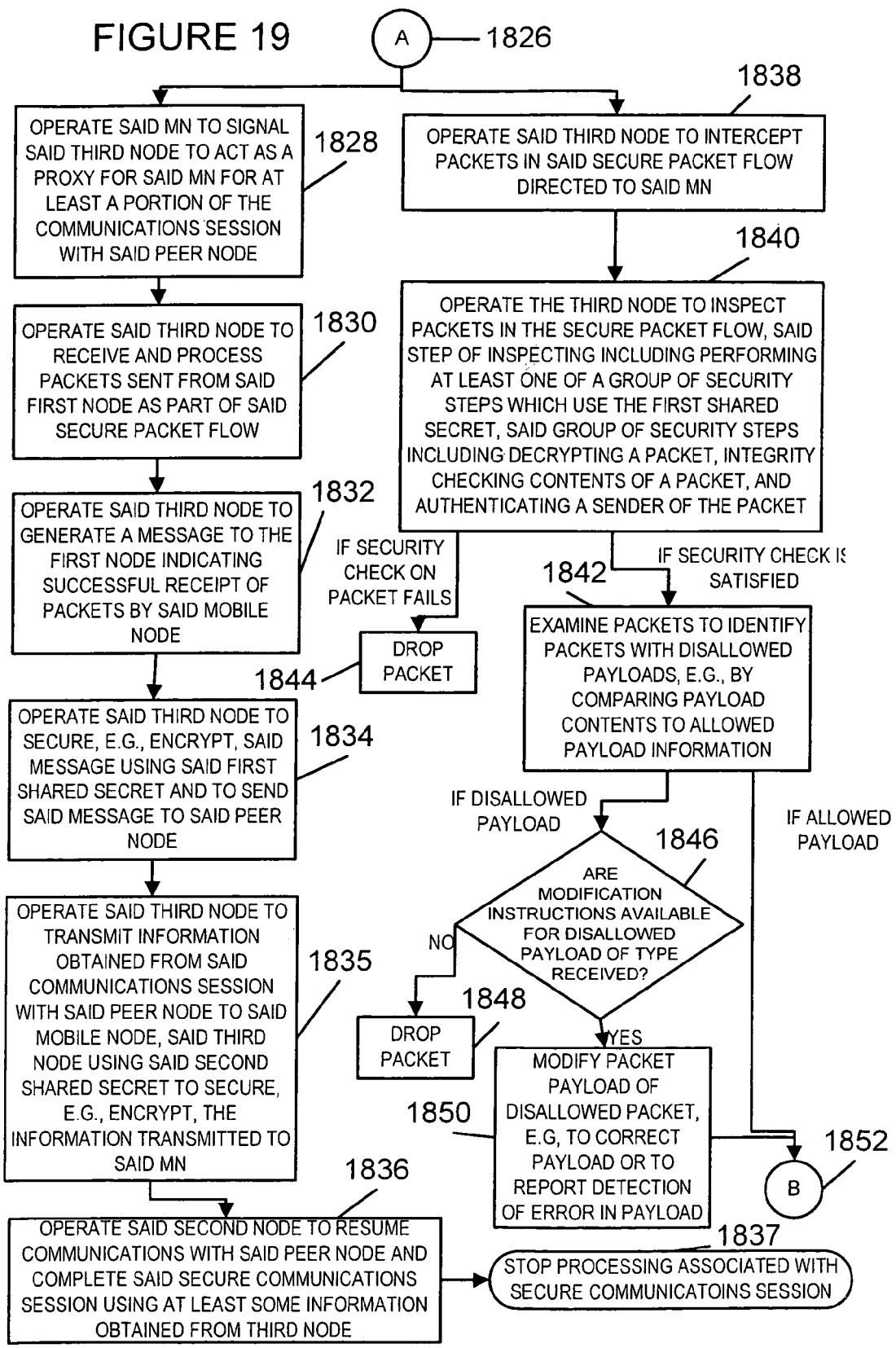
Figure 20:
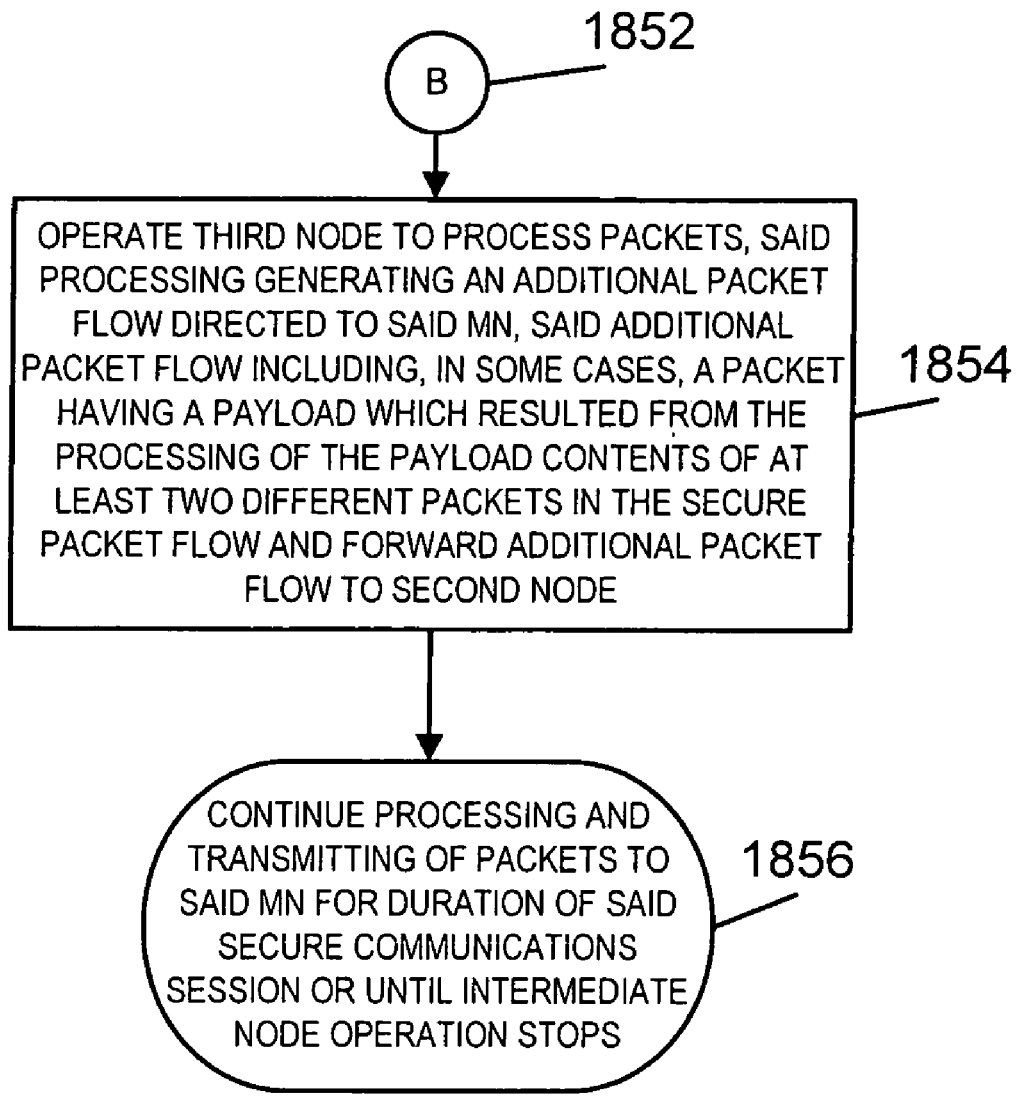

FIGS. 18-20 show steps of an exemplary method 1800 where a security association is maintained between a correspondence node, e.g., peer node 1114, mobile node 1102 and an intermediate node, e.g., MNPS 1140. The method 1800 starts at node 1802 with initialization of the various network components in step 1804. Operation proceeds from step 1804 to step 1806, 1808 and 1812. In step 1806, the MN 1102 and MNPS 1140 are operated to perform a mutual authentication operation. Operation proceeds from step 1806 to step 1816.

In step 1808 the first shared secret is communicated, e.g., from a security server, to the peer node 1114 and the MN 1102, e.g., using a secure communications link, or via a dynamic key generation and exchange protocol between the peer node and the Mobile Node. Then, in step 1810 the nodes 1114, 1102 store the first shared secret, e.g., in memory. Operation proceeds from step 1810 to step 1816.

In step 1812 the second shared secret is communicated to the MN 1102 and to the MNPS 1140. Then in step 1814 the nodes 1102, 1140 store the second shared secret, e.g., in memory. From step 1814 operation proceeds to step 1816. In step 1816 the MN 1102 is operated to encrypt the first shared secret as a function of the second shared secret. Then, in step 1818 the MN 1102 sends the encrypted first shared secret to the MNPS 1140. In step 1820 the MNPS decrypts the first shared secret using the second shared secret and then stores it for use in processing packets corresponding to communication between said peer node 1114 and MN 1102. Operation proceeds from step 1820 to step 1822 wherein the peer node 1114 initiates a communications session with the MN 1102 using the first shared secret to secure packets sent between the peer node 1114 and the MN 1102. In step 1824 the peer node 1114 secures packets to be communicated to the MN 1102, e.g., by encrypting them using the first shared secret. The secure packets are then directed to the MN 1102, e.g. transmitted with a destination address corresponding to the MN 1102 and a source address corresponding to the peer node 1114. The transmission of packets results in a secure packet flow that is directed to said MN 1102. Similarly a matching secure flow will typically exist back from the MN 1102 to the peer node 1114. Operation proceeds from step 1824 to steps 1828 and 1838 via node 1826. Step 1828 is the start of processing which will use the MN proxy functionality of the MNPS 1140 and may occur at any time after the start of the communications session. Step 1838 marks processing which occurs while the communications session is ongoing and is performed on an ongoing basis.

In step 1828 the MN 1102 signals the MNPS 1140 to act as a proxy for the MN 1102 for at least a portion of the secure communications session with the peer node 1114. Communications session status and other state information may be transferred to the MNPS 1140 in step 1828. The mobile 1102 or MNPS 1140 may signal a mobility agent to redirect the secure flow of packets to the MNPS 1140 after transfer of the state information if they were not already being passed to the MNPS 1140. In step 1830 the MNPS 1140 receives and processes packets sent from the first node as part of said secure packet flow, e.g., while acting as an communications session application proxy for the MN 1102 in a manner that is transparent to the peer node 1114. As part of the processing performed by the MNPS 1140, the MNPS generates a message to the first node indicating successful receipt of packets by said mobile 1102. This message may be an acknowledgement message the peer node 1114 expects to receive from the mobile 1102, as part of normal communications session operation. In step 1834, the MNPS 1140 proceeds to secure the message generated in step 1832, e.g., by encrypting it using the first shared secret. The secured message is then sent to the peer node. The secured message, e.g., packet, may include a source address corresponding to the MN 1102 to make the message appear as if from the MN 1102.

As the communication session progresses, one or more events may indicate that the MN 1102 is to resume responsibility for the communications session with the peer node. For example, the MNPS 1140 may detect a trigger event such as completion of downloading of a file or portion of a file or may receive a message indicating that the MN 1002 has returned to an active state of operation after being in a sleep state for a period of time. In step 1835 the MNPS 1140 transmits information obtained from said communications session with said peer node to said mobile node. This may include the result of processing the payload of multiple received packets to generate information not present in the individual packets. It may also included updated security information, e.g., an updated first shared secret received by said MNPS 1140 while interacting with the peer node 1114. The MNPS 1140 normally uses the second shared secret, but in some cases uses the first shared secret, to encrypt the information being sent to the MN 1102. The MN 1102, in step 1836 resumes communication with said peer node and completes said secure communication session using at least some information, e.g., application state and/or processing results, obtained from the MNPS 1140. Processing associated with the exemplary secure communication session may then cease in step 1837, e.g., when the session is terminated by the MN 1102 or peer node 1114.

Processing in step 1838 is performed on packets passing through said MNPS 1140, e.g., when acting as a "man in the middle", for security purposes, as authorised by the MN 1102. In step 1838, the third node intercepts packets in the secure packet flow, e.g., packets being communicated between said peer node 1114 and the MN 1102 as part of the communications session. Then in step 1840 the MNPS 1140 performs a packet inspection operation on the intercepted packets. The inspection includes performing at least one of a group of security steps which use the first shared secret. The group of security steps includes, e.g., decrypting a packet, performing an integrity check on the header and/or payload of the decrypted packet, and authenticating the sender of the inspected packet.

Operation proceeds from inspection step 1840 on a per packet basis, e.g., as the security inspection of packets in the secure flow is completed. If the security check on a packet fails, the packet is dropped in step 1844. If a packet passes the security checks performed in step 1840 processing of the packet proceeds to step 1842. In step 1842 the packet contents are examined to determine if the packet header and/or payloads are headers and/or payloads which are allowed to be communicated to the MN 1102. This represents a packet header and/or payload filtering operation. Packet payload examination is described henceforth, without loss of generality, and wherever mentioned it should be considered to include the capability to additionally, or alternatively, examine and process the packet header fields. In step 1842 information about the packet payload, e.g., payload content information obtained by examining the decrypted packet, is compared to information, e.g., a table, of information indicating allowable packet payload contents. If for example, the payload information determined from examining the packet does not match stored information indicating one or more allowable payload types, the payload is considered to be a disallowed payload and processing proceeds to step 1846. If the payload is determined to be allowable operation proceeds directly to step 1854 via connecting node 1852.

In step 1846 stored payload modification information is checked to determine if there are modification instructions stored indicating how the disallowed payload should be modified. If there are no modification instructions for the type of disallowed payload being processed, the packet with the disallowed payload is dropped in step 1848. However, if modification instructions are present, operation proceeds from step 1846 to step 1850 wherein the packet payload is modified. The modification of the packet payload may be, e.g., to correct the payload contents to that that payload will be an allowable payload, and/or to include a message indicating that an error in the payload was detected. The error message may indicate the error was detected by the MNPS 1140. Operation proceeds from step 1850 to step 1854 via connecting node 1852.

In step 1854, the MNPS 1140 processes packets with allowable packet payload content, to generate an addition packet flow directed to the MN 1102. This flow may be a substitute for the original secured flow of packets from the peer node 1114. The additional packet flow includes, in some cases, a packet having a payload which resulted from the processing of the payload contents of at least two different packets in the secure packet flow. Operating the MNPS 1140 to generate the additional packet flow includes, in some cases performing at least one of a group of security steps which use one of the first and second shared secrets, the group of security steps including, e.g., encrypting a packet, adding an integrity check for the contents of the packet, and adding an authenticator check for the packet sender. The packets in the additional packet flow normally include a destination address corresponding to the MN and a source address corresponding to the peer node 1114 or MNPS 1140. When the source address corresponds to the peer node 1114, the first shared secret is normally used to encrypt the packets in the additional flow. When the source address corresponds the MNPS 1140, the second shared secret is normally used to encrypt the packets in the additional packet flow.

Operation proceeds from step 1854 to step 1856. Step 1856 is provided to illustrate that processing and transmitting of packets to the MN 1102 from the MNPS 1140 will continue for the duration of the secure communications session for which the UPS 1140 is acting as an authorized "man in the middle" or until MNPS 1140 stops, e.g., in response to a control signal from the MN 1102 to stop processing the packets corresponding to the ongoing communications session.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s). The methods and apparatus of the present invention are applicable to a wide range of communications systems including many OFDM, CDMA and other non-OFDM systems.

The methods and apparatus of the present invention may be, and in various embodiments are, used with CDMA, orthogonal frequency division multiplexing (OFDM), and/or various other types of communications techniques which may be used to provide wireless or fixed communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Numerous additional variations on the methods and apparatus of the present invention described above will be apparent to those skilled in the art in view of the above description of the invention. Such variations are to be considered within the scope of the invention.

What is claimed is:

1. A communications method for use in a system comprising a first, second and third nodes, and a first secret, said first secret being shared between the first and second nodes to secure communications between said first and second nodes, the method comprising:

operating the first node to establish a secure communications session with said second node using the first shared secret to secure the contents of packets communicated from the first node that are directed to the second node as part of the secure communications session, packets communicated from the first node that are directed to the second node being addressed to said second node by use of a second node destination address;

operating a third node which is coupled to said first and second nodes to maintain in memory a copy of said first shared secret; and operating the third node to receive a secure flow of packets from the first node that are directed to said second node as part of the secure communications session.

2. The method of claim 1, further comprising:
operating the third node to receive from said second node the first shared secret and to store the first shared secret in memory, said received first, shared secret being encrypted using a second shared secret known to the second and third nodes.

3. The method of claim 2, further comprising:
operating said third node to receive and process packets sent from said first node as part of said established communications session, said third node sending a message to the first node indicating successful receipt of packets by said second node.

4. The method of claim 3, wherein said third node uses said first shared secret to secure the message to the first node.

5. The method of claim 4, wherein said third node operates as an application proxy for said second node during said secure communications session without informing said first node that the third node is acting as a proxy in the place of said second node.

6. The method of claim 5, further comprising:
operating the third node to transmit information obtained from said communications session while said third node was acting as a proxy for said second node to said second node; and
operating the second node to continue the secure communications session with the first node.

7. The method of claim 1, further comprising:
operating the third node to inspect the secure packet flow from the first node, said step of inspecting said secure packet flow including performing at least one of a group of security steps which use the first shared secret, said group of security steps comprising: decrypting a packet, integrity checking contents of a packet, and authenticating a sender of a packet.

8. The method of claim 7, further comprising: operating the third node to drop the packet from the packet flow if the performed at least one of the group of security checks fails.

9. The method of claim 7, further comprising:
operating the third node to additionally process the packets from the packet flow if no performed security check in said group of security checks fails.

10. The method of claim 9, further comprising:
operating the third node to identify a packet with a disallowed packet payload by comparing at least a portion of the payload of each packet in the packet flow to information indicating allowed packet payloads, payloads of a type which are not indicated by said information being disallowed packet payloads.

11. The method of claim 10, further comprising:
operating the third node to drop an identified packet with a disallowed packet payload.

12. The method of claim 10, further comprising:
operating the third node to modify the packet payload of packets identified to include a disallowed packet payload based on stored information indicating payload modifications to be made to disallowed packet payloads.

13. The method of claim 12, wherein the modified payload generated by modifying a packet payload includes a message indicating that an erroneous payload was detected at the third node.

14. The method of claim 10, further comprising:
operating the third node to process at least two packets in the packet flow to produce at least a third packet.

15. The method of claim 9, further comprising;
operating the third node to generate an additional packet flow from the received packet flow directed to the second node and to forward the additional packet flow to the second node, packets in said additional packet flow having a source address corresponding to the first node and a destination address corresponding to the second node, said step of generating an additional packet flow including at least one of a group of security steps which use the first shared secret, the group of security steps consisting of: encrypting a packet, adding an integrity check for the contents of the packet, and adding an authenticator check for the packet sender.

16. The method of claim 1, wherein the second and third nodes each include a second secret used to secure communications between the third node and the second node, the method further comprising:
operating the third node to generate an additional packet flow from the received packet flow directed to the second node and to forward the additional packet flow to the second node, packets in said additional packet flow having a source address corresponding to the third node and a destination address corresponding to the second node, said step of generating an additional packet flow including at least one of a group of security steps which use the second shared secret, the group of security steps consisting of: encrypting a packet, adding an integrity check for the contents of the packet, and adding an authenticator check for the packet sender.

17. The method of claim 16, further comprising:
operating the second node to communicate the first shared secret to the third node, the first shared secret being encrypted using the second shared secret.

18. The method of claim 17, further comprising:
mutually authenticating the second and third nodes prior to the second node transmitting the first shared secret to the third node.

19. A communications system, comprising:
a first node including a first shared secret and a communications application for establishing a secure communications session using said first shared secret to secure packets communicated as part of said secure communications session;
a mobile node including said first shared secret, a second shared secret, and at least one communications application for maintaining a secure communications session with said first node using said first shared secret;
an intermediate node, coupled to said first node and said mobile node, said intermediate node including said first shared secret and said second shared secret, said intermediate node including:
means for processing packets re-directed away from said mobile node to said intermediate node, said redirected packets being packets which were originally directed by said first node towards said mobile node as part of a secure communications session using said first shared secret; and
means for sending a message to said first node secured by said first shared secret indicating successful receipt of said packets by said mobile node.

20. The communication system of claim 19, wherein said intermediate node further includes:
means for communicating information generated by processing packets directed to said mobile node to said mobile node in packets secured using said second shared secret, said information being the result of application processing performed on the payload of at least two data packets to generate information not present in either of the two data packets.

21. The communication system of claim 20, wherein the mobile node includes means for sending said first shared secret to said intermediate node in an encrypted format resulting encryption processing using said second shared secret.

22. A communications system for use with a second node, said communications system comprising:
a first node including:
memory means for storing a first secret, said first secret being shared between the first node and the second node to secure communications between said first and second nodes; and
means for establishing a secure communications session with said second node using the first shared secret to secure the contents of packets communicated from the first node that are directed to the second node as part of a secure communications session;
a third node, coupled to said first and second nodes, the third node including:
means for storing a copy of said first shared secret; and
means for receiving a secure flow of packets from the first node that are re-directed away from said second node to said third node, said redirected packets being packets which were originally directed to said second node as part of the secure communications session.

23. The communication system of claim 22, wherein said third node further includes:
means for receiving from said second node the first shared secret; and
means for storing the first shared secret in memory, said received first shared secret being encrypted using a second shared secret known to the second and third nodes.

24. The communications system of claim 22, wherein said first node is a mobile node.

25. A method of operating a third node in a system comprising a first node, a second node and said third node, a first secret being shared between the first and second nodes to secure communications between said first and second nodes, the method comprising:
receiving from said second node the first shared secret;
storing said first shared secret in memory; and
receiving a secure flow of packets from the first node that are re-directed away from said second node to said third node, said redirected packets being packets which were originally directed to said second node as part of the secure communications session.

26. The method of claim 25, wherein said received first shared secret is received in an encrypted form, said first shared secret having been encrypted using a second shared secret known to the second and third nodes.

27. The method of claim 25, further comprising:
processing packets received from said first node which are part of said established communications session; and
sending a message to the first node indicating successful receipt of packets by said second node.

28. The method of claim 27, wherein said third node uses said first shared secret to secure the message to the first node.

29. The method of claim 28, wherein said third node operates as an application proxy for said second node during a portion of said secure communications session without informing said first node that the third node is acting as a proxy in the place of said second node.

30. The method of claim 29, further comprising:
transmitting information obtained from said communications session while said third node was acting as a proxy for said second node to said second node.

31. The method of claim 25, further comprising:
using said first shared secret to decrypt a packet included in said secure flow of packets.

32. The method of claim 31, further comprising:
processing said decrypted packet; and
communicating the result of processing said decrypted packet to said second node in an encrypted packet.

33. The method of claim 25, further comprising:
processing at least two packets in the secure flow of packets to produce at least a third packet; and
communicating the third packet to the second node.

34. A third node in a system comprising a first node, a second node and said third node, a first secret being shared between the first and second nodes to secure communications between said first and second nodes, the third node comprising:
a receiver for receiving from said second node the first shared secret;
memory in which said first shared secret is stored; and
an agent module for receiving a secure flow of packets from the first node that are re-directed away from said second node to said third node, said redirected packets being packets which were originally directed to said second node as part of the secure communications session.

35. The third node of claim 34, wherein said received first shared secret is received in an encrypted form, said first shared secret having been encrypted using a second shared secret known to the second and third nodes.

36. The third node of claim 34, wherein said agent module includes:
a proxy module for processing packets received from said first node which are part of said established communications session and sending a message to the first node indicating successful receipt of packets by said second node.

37. A third node in a system comprising a first node, a second node and said third node, a first secret being shared between the first and second nodes to secure communications between said first and second nodes, the third node comprising:
means for receiving from said second node the first shared secret;
means for storing said first shared secret; and
means for receiving a secure flow of packets from the first node that are re-directed away from said second node to said third node, said redirected packets being packets which were originally directed to said second node as part of the secure communications session.

38. The third node of claim 37, wherein said received first shared secret is received in an encrypted form, said first shared secret having been encrypted using a second shared secret known to the second and third nodes.

39. The third node of claim 37, wherein said means fore receiving a secure flow of packets includes:
means for processing packets received from said first node which are part of said established communications session; and
means for sending a message to the first node indicating successful receipt of packets by said second node.

40. A non-transitory machine readable medium including computer executable instructions for controlling a third node in a system comprising a first node, a second node and said third node, a first secret being shared between the first and second nodes to secure communications between said first and second nodes, to perform a communications method including the steps of:
- receiving from said second node the first shared secret;
- storing said first shared secret in memory; and
- receiving a secure flow of packets from the first node that are re-directed away from said second node to said third node, said redirected packets being packets which were originally directed to said second node as part of the secure communications session.

41. The machine readable medium of claim 40, wherein said received first shared secret is received in an encrypted form, said first shared secret having been encrypted using a second shared secret known to the second and third nodes.

42. The method of claim 1, wherein the second node destination address is a Home Address of the second node.

43. A communications method for use in a system comprising a first node, a second node and a third node, and a first secret, said first secret being shared between the first and second nodes to secure communications between said first and second nodes, the method comprising:
- operating the first node to establish a secure communications session with said second node using the first shared secret to secure the contents of packets communicated from the first node that are directed to the second node as part of the secure communications session;
- operating a third node which is coupled to said first and second nodes to maintain in memory a copy of said first shared secret; and
- operating the third node to receive a secure flow of packets from the first node that are re-directed away from said second node to said third node, said redirected packets being packets which were originally directed to said second node as part of the secure communications session.

44. The method of claim 43, wherein packets communicated from the first node that are directed to the second node as part of the secure communications session include a Home Address of the second node as a destination address prior to said re-direction.

45. The method of claim 43, further comprising:
- operating the third node to receive from said second node the first shared secret and to store the first shared secret in memory, said received first shared secret being encrypted using a second shared secret known to the second and third nodes.

46. The method of claim 43, further comprising:
- operating said third node to send a message to the first node indicating successful receipt of packets by said second node, in response to received redirected packets.

47. A communications method for use in a system comprising a first node, a second node and a third node, and a first secret, said first secret being shared between the first and second nodes to secure communications between said first and second nodes, the third node being on a communications path extending between said first and second nodes, the method comprising:
- operating the first node to establish a secure communications session with said second node using the first shared secret to secure the contents of packets communicated from the first node that are directed to the second node as part of the secure communications session;
- operating a third node which is coupled to said first and second nodes to maintain in memory a copy of said first shared secret;
- operating the third node to receive a secure flow of packets from the first node that are directed to said second node as part of the secure communications session; and
- operating the third node to intercept and process said received secure flow of packets from the first node.

48. The method of claim 47 wherein packets directed to said second node include as a destination address a Home Address of the second node.

49. The method of claim 47, further comprising:
- operating the third node to transmit another packet flow, said another packet flow including as a source address an address corresponding to the second node and including packets generated from said intercepted packets.

50. The method of claim 47, further comprising:
- operating the third node to receive from said second node the first shared secret and to store the first shared secret in memory, said received first shared secret being encrypted using a second shared secret known to the second and third nodes.

51. The method of claim 47, further comprising:
- operating said third node, in response to receiving packets in said secure flow of packets, to send a message to the first node indicating successful receipt of packets by said second node.

* * * * *